(12) United States Patent
Zhang et al.

(10) Patent No.: US 9,537,403 B2
(45) Date of Patent: Jan. 3, 2017

(54) CONTROL CIRCUIT FOR A SWITCHED-MODE POWER SUPPLY

(71) Applicant: NXP B.V., Eindhoven (NL)

(72) Inventors: Cheng Zhang, Nijmegen (NL); Joan Wichard Strijker, Wijchen (NL); Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 561 days.

(21) Appl. No.: 13/921,922

(22) Filed: Jun. 19, 2013

(65) Prior Publication Data

US 2014/0016373 A1  Jan. 16, 2014

(30) Foreign Application Priority Data

Jul. 6, 2012 (EP) .................... 12175428

(51) Int. Cl.
*H02M 3/335* (2006.01)

(52) U.S. Cl.
CPC ..... *H02M 3/33507* (2013.01); *H02M 3/33523* (2013.01)

(58) Field of Classification Search
CPC .............. H02M 3/335; H02M 3/33523; H02M 3/33507; H02M 3/33553; H02M 3/33538; Y02B 70/1433
See application file for complete search history.

(56) References Cited

U.S. PATENT DOCUMENTS 6,426,663 B1 * 7/2002 Manlove ................. G01P 1/006
327/307
2003/0042437 A1   3/2003 Worley et al.
2005/0017764 A1   1/2005 Feldtkeller
2009/0016086 A1   1/2009 Huynh et al.
2010/0020578 A1 * 1/2010 Ryu .................... H02M 1/4225
363/68

(Continued)

FOREIGN PATENT DOCUMENTS

DE       101 20 287 A1    11/2002

OTHER PUBLICATIONS

NXP B.V., TEA1733T, GreenChip SMPS Control IC, Product Data Sheet, Rev. 6, 20 pgs. (Jan. 26, 2011).

(Continued)

*Primary Examiner* — Gustavo Rosario Benitez

(57) ABSTRACT

A control circuit for a switched-mode power supply having an input side (101) connectable to an electrical power source and an output side (102) connectable to a load. The control circuit comprises: a primary control circuit (140) adapted to generate a driving signal for a switching element (110) at the input side of the power supply; a secondary control circuit (150) adapted to monitor an output signal at the output side (102) of the power supply; and an opto-coupler (300, 400), wherein the opto-coupler is arranged to receive its input from the secondary control circuit and to provide a control signal to the primary control circuit, and the primary control circuit comprises a compensation circuit (900, 1000, 1100, 1400, 2010, 2610) adapted to process the control signal to generate a compensation signal for reducing power consumption in the opto-coupler, wherein the compensation circuit is adapted to generate the compensation signal such that a current in the opto-coupler tends to return to a desired minimum value.

13 Claims, 14 Drawing Sheets

(56) References Cited

U.S. PATENT DOCUMENTS

| | | | |
|---|---|---|---|
| 2010/0194463 A1* | 8/2010 | Moon | H02M 1/32 |
| | | | 327/427 |
| 2010/0327194 A1 | 12/2010 | Xu et al. | |
| 2010/0327195 A1 | 12/2010 | Huang et al. | |
| 2011/0133829 A1* | 6/2011 | Huang | H02M 3/33507 |
| | | | 327/590 |
| 2011/0222318 A1 | 9/2011 | Uno et al. | |
| 2011/0280051 A1 | 11/2011 | Halberstadt | |
| 2012/0099344 A1* | 4/2012 | Adragna | H02M 3/3372 |
| | | | 363/21.03 |
| 2012/0194162 A1* | 8/2012 | Lin | H02M 1/14 |
| | | | 323/304 |
| 2013/0003421 A1* | 1/2013 | Fang | H02M 3/33523 |
| | | | 363/21.01 |

OTHER PUBLICATIONS

Extended European Search Report for European Patent Appln. No. 12175428.7 (Nov. 20, 2012).

* cited by examiner

CONTROL CIRCUIT FOR A SWITCHED-MODE POWER SUPPLY

CROSS-REFERENCE TO RELATED APPLICATIONS

This application claims the priority under 35 U.S.C. § 119 of European patent application no. 12175428.7, filed on Jul. 6, 2012, the contents of which are incorporated by reference herein.

This invention relates to control of a Switched Mode Power Supply (SMPS). In particular, it relates to the control of a secondary-sensed SMPS, comprising an opto-coupler for control feedback between the secondary (output) side and the primary (input) side of the SMPS. The control circuits described herein may be particularly relevant for a SMPS which comprises a flyback converter, or a resonant converter.

A Switched Mode Power Supply converts electrical power from an electrical source into electrical power with voltage and current characteristics different from the source and delivers it to a load. The conversion is performed using a switching element, which repeatedly switches between a conductive state, in which current flows through it and a non-conductive state, in which substantially no current flows.

An SMPS can offer efficient conversion of the electrical characteristics (in particular, voltage and current) of a power source, to drive a load that requires different characteristics. The switching element dissipates very little energy in its "on" and "off" states and the transitions between these states are very short (almost instantaneous). This enables the SMPS to be more efficient than a linear power supply, which regulates output power by continually dissipating energy.

The SMPS will typically incorporate a control circuit, for monitoring the load (which may be variable) and controlling the switching element so that a consistent output is delivered. For example, if the load draws more current, tending to pull down the output voltage of the SMPS, the control circuit may increase a duty cycle of the switching element, so as to inject more electrical power into the converter and pull up the output voltage.

A typical example application is the use of a SMPS to convert high-voltage AC mains electricity into low-voltage DC electricity, suitable for driving electronic components such as integrated circuits. It is a common requirement in this and other applications for the input side of the SMPS to be electrically isolated from the output side. For this reason, the actual power delivery may be accomplished using a transformer. It may also be required to include isolation in the control circuit—since the control circuit provides feedback from the output side to the input side of the SMPS. The isolation in the control circuit is commonly provided by an opto-coupler. This electronic component is also known as an opto-isolator or photo-coupler. It comprises a light source (emitter) and a photosensor, optically coupled to the source, whereby the photosensor is operable to detect the intensity of light emitted from the source. The emitter may, for example, comprise a Light Emitting Diode (LED); in particular, an infrared LED. The photosensor may comprise a photoresistor, a photodiode, or a phototransistor, among others.

According to an aspect of the invention, there is provided a control circuit for a switched-mode power supply having an input side connectable to an electrical power source and an output side connectable to a load, the control circuit comprising:

a primary control circuit adapted to generate a driving signal for a switching element at the input side of the power supply;

a secondary control circuit adapted to monitor an output signal at the output side of the power supply; and an opto-coupler, wherein the opto-coupler is arranged to receive its input from the secondary control circuit and to provide a control signal to the primary control circuit, and the primary control circuit comprises a compensation circuit adapted to process the control signal to generate a compensation signal for reducing power consumption in the opto-coupler, wherein the compensation circuit is adapted to generate the compensation signal such that a current in the opto-coupler tends to return to a desired minimum value.

The compensation circuit may be adapted to generate the compensation signal such that it responds to low-frequency variations in the input to the opto-coupler to a greater extent than high-frequency variations, so that the current in the opto-coupler tends to return to a desired minimum steady-state value.

This provides a relatively high gain in the overall control loop of the SMPS, up to a relatively low frequency, and a relatively low gain, at higher frequencies. This helps to reduce the steady-state current flowing in the opto-coupler, without negatively influencing the stability of the regulation loop. The overall control loop is the feedback loop formed by the input side and output side of the SMPS, together with the feedback path provided by the secondary control circuit and primary control circuit.

The compensation circuit may comprise an adaptive voltage supply for the opto-coupler.

In this case, the compensation signal is preferably a supply voltage delivered to a resistor coupled in series with the opto-coupler.

The compensation circuit may comprise a transconductance amplifier; and the compensation signal may be a compensation current output from said amplifier.

In this case, the primary control circuit preferably further comprises a fixed current source and the current in the opto-coupler is the sum of the current produced by the fixed current source and the compensation current.

The control signal may be a control current and the compensation circuit may comprise an adaptive current supply for the opto-coupler.

The compensation signal may be a reference current and the current in the opto-coupler may be the sum of the control current and the reference current. The reference current may be the output of the adaptive current supply.

The compensation circuit may be adapted to generate the reference current as a function of a low-pass filtered version of the control current.

This helps to provide the desired behaviour, wherein low-frequency, slow changes in the steady state signals are tracked with relatively high gain. Meanwhile, high-frequency transient behaviour is not reflected in the compensation signal.

In some embodiments, a time constant with which the compensation signal responds to variations in the input to the opto-coupler may be variable.

This is a further advantageous way of providing the desired loop stability and temporal response.

The time constant may be variable according to at least one of: an amplitude of the control signal; and whether or not the switched-mode power supply is operating in a burst mode.

The time constant may be changed if the control signal reaches or exceeds a predetermined threshold or if a difference between the control signal and the compensation signal reaches or exceeds a threshold. This allows the circuit to respond quickly to large amplitude changes, when necessary.

Alternatively or in addition, the time constant may be changed depending upon whether or not the power supply is operating in burst mode. The time constant is preferably chosen to be long in a normal operating mode (when low gain is required) and short in a burst operating mode (when higher gain is required). This helps to provide the desired stability and response at low and high frequencies.

According to another aspect of the invention there is provided a control circuit for a switched-mode power supply having an input side connectable to an electrical power source and an output side connectable to a load, the control circuit comprising:

a primary control circuit adapted to generate a driving signal for a switching element at the input side of the power supply;

a secondary control circuit adapted to monitor an output signal at the output side of the power supply; and an opto-coupler, wherein the opto-coupler is arranged to receive its input from the secondary control circuit and to provide its output as a control signal to the primary control circuit, and the primary control circuit comprises a compensation circuit adapted to process the control signal to generate a compensation signal, the primary control circuit being adapted to generate the driving signal based upon a combination of the control signal and the compensation signal, and wherein the compensation circuit is adapted to detect, in the control signal, changes from a desired operating condition and generate the compensation signal so as to make the control signal return to the desired condition.

The present inventors have recognised that the opto-coupler is a potentially significant cause of energy loss, in an SMPS. The operating current of an opto-coupler must remain higher than a minimum value to guarantee a normal function of the opto-coupler. The maximum operating current occurs at minimum load and a minimum current is required that occurs at a maximum load. In a conventional control circuit configuration, the maximum operating current of the opto-coupler is then determined by the parameters of the SMPS. However, the inventors have recognised that it is possible to reduce the range of the current flowing in the opto-coupler without reducing the operating power range of the SMPS. This can enable the total power dissipation (loss) in the SMPS to be reduced, because the maximum energy loss in the opto-coupler is reduced, compared to the conventional control circuit.

The inventors have further recognised that in a common control circuit configuration, the opto-coupler draws maximum current when the SMPS is lightly loaded or has no load. The invention has particular benefit for such a circuit configuration, because the opto-coupler current at no-load contributes a substantial proportion of the total energy consumption in this state.

According to embodiments of the circuit summarised above, the compensation signal corrects for changes in the control signal—in particular changes that are caused by a change in the load—in order to return the control signal to the desired operation point or range. This is advantageous because the control signal is provided by the output of the opto-coupler and is therefore directly related to energy dissipation in the opto-coupler. With a control circuit according to an embodiment of the present invention, the operating point of the opto-coupler can be chosen so as to reduce the energy dissipation in the opto-coupler. When the load on the power supply changes, this is detected by the secondary control circuit and fed-back to the primary control circuit via the opto-coupler. However, instead of the opto-coupler remaining at a different operating point (voltage and/or current) or operation range, the compensation circuit adapts the compensation signal so that the opto-coupler output can return to its original (low-loss) operating point or range. This helps to increase the overall energy efficiency of the power supply, by avoiding unnecessary energy dissipation.

The compensation circuit—through the feedback loop formed by the switched-mode power supply and its control circuit—tends to resist and undo changes in the control signal by changing the compensation signal to adapt the power delivered to the load. One implication of this is that different driving signals can be generated for the same value of the control signal by varying the value of the compensation signal. That is, the parameters of the driving signal are no longer a monotonic function of the control signal. Similarly, the output power generated as a result of the switching is no longer a monotonic function of the control signal (since the switching is controlled by the driving signal).

The desired operating condition of the control signal may comprise a desired voltage or desired voltage range, or a desired current or desired current range, or any combination of these parameters.

The switching element at the input side controls the flow of power into the input side and therefore the power delivered at the output side of the SMPS. The driving signal is for controlling the switching element to switch between open (non-conductive) and closed (conductive) states.

The input to the opto-coupler may comprise a current generated by the secondary control circuit. The output from the opto-coupler, which comprises the control signal for the primary control circuit, may comprise an output voltage across the output of the opto-coupler.

Note that, as summarised above, the compensation signal is generated based on the control signal; however, it is also able to influence the control signal, in order to bias it to the desired operating point. The compensation signal can influence the control signal by means of a feedback loop: the compensation signal affects the driving signal (because the driving signal is generated by combining the control signal and the compensation signal); the driving signal controls the switching of the switching element and thereby the output power of the SMPS; the secondary control circuit monitors the output power of the SMPS and this determines the input current to the opto-coupler; and the opto-coupler output is the control signal.

The compensation circuit may comprise at least one comparator, configured to compare the control signal with at least one predetermined threshold value, and a counter, coupled to the comparator and configured to increment or decrement a level of the compensation signal when the control signal reaches or crosses the threshold.

The counter changes the compensation signal when the control signal reaches or crosses the threshold. The predetermined threshold may be fixed or may be dependent upon the level of the compensation signal.

Here, stepping the compensation signal to a different value is analogous to changing gear in a car. The control signal is analogous to the throttle (accelerator) controlling the revolution of the engine. By shifting gears, the car can maintain the same speed with lower revs.

The compensation circuit may comprises: a first comparator arranged to increment a value of the counter if the control signal exceeds a first threshold; and a second comparator arranged to decrement the value of the counter if the control signal drops below a second threshold.

Continuing the analogy above, the first comparator triggers a change to a higher "gear" and the second comparator triggers a change to a lower "gear". The first and second thresholds represent a desired operating range for the control signal.

The compensation circuit may further comprise a first timer, configured to disable further incrementing or decrementing of the compensation signal level for a predetermined time interval after a previous increment or decrement has occurred, respectively.

Waiting for a predetermined time interval allows the control signal to drop back within the desired range. The timer suppresses unnecessary additional steps (increments or decrements) in the compensation signal. If the control signal reverts to the desired range within the interval, then the preceding increment/decrement in the compensation signal was sufficient, and not further step is made. On the other hand, if the control signal is still outside the desired range after the time interval has elapsed, then the comparator will trigger the counter once more to further increment or decrement the compensation signal. For the first timer, the duration of the time interval may be chosen according to the reaction time of the feedback loop. A longer reaction time can be accommodated by choosing a longer duration for the time interval.

The compensation circuit may further comprise a second timer, configured to disable incrementing of the compensation signal level for a predetermined time interval after a previous decrement has occurred; and/or disable decrementing of the compensation signal level for a predetermined time interval after a previous increment has occurred.

The second timer suppresses bounce—that is, it prevents the compensation signal from reverting to its previous level immediately after an increment or decrement has occurred. This improves the stability of the circuit.

The time interval associated with the second timer may be longer or shorter than the time interval associated with the first timer. The time interval for the second timer may be chosen according to the stabilization time of the feedback loop—a longer stabilization time can be accommodated by a longer duration for the time interval.

The primary control circuit may be configured so that the compensation signal controls a peak current in the input side of the power supply.

The current in the input side may increase while the switching element is turned on. The peak current may be determined by switching off the element, when a threshold is reached. The peak current can therefore influence the output power delivered to the load, by controlling the duty cycle of the switching element. The current in the input side may be sensed by measuring the voltage across a sense-resistor connected in series with the switching element. This voltage provides a sense signal.

Note that the peak current may also, optionally, be influenced by other factors—it need not be uniquely determined by the compensation signal.

The control signal may be coupled to one input of a comparator which determines the peak current and the other input of the comparator may depend upon the compensation signal.

The compensation signal may be indirectly coupled to the other input of the comparator. For example, the compensation signal may be combined with a sense signal which is proportional to a current flowing in the switching element. In particular, the compensation signal and sense signal may be combined by adding them, or subtracting one from the other.

The primary control circuit may be configured such that the compensation signal controls a conversion frequency of the power supply.

The conversion frequency may be defined as the frequency with which the switching element is turned on—for example, a conversion frequency of 100 kHz would mean that the switching element is turned on one hundred thousand times per second. The conversion frequency influences the power supplied to the load by controlling how often the switching element is activated. Therefore, the compensation signal may be used to determine the frequency of the driving signal.

Note that the conversion frequency need not be uniquely determined by the compensation signal—it may also, optionally, be affected by other factors.

The primary control circuit may comprise a Voltage Controlled Oscillator controlled by the compensation signal. The control input of the VCO may be coupled to the output of the compensation circuit.

When the compensation circuit comprises the at least one comparator and the counter, as summarised above, the Voltage Controlled Oscillator (VCO) may be controlled by the output of the counter.

The primary control circuit may comprise a latch and the output of the Voltage Controlled Oscillator may be coupled to an input of the latch.

The latch may be an RS-latch. The output of the VCO may be coupled to a SET input of the latch. The RESET input of the latch may be coupled to the output of a comparator. This comparator may be arranged to compare the control signal with a sense signal that is proportional to a current flowing in the switching element.

A first range of output power deliverable by the power supply at a first value of the compensation signal may overlap with a second range of output power deliverable by the power supply at a second, different value of the compensation signal.

The output power actually delivered within each range may be determined by the control signal. Thus, the same feature may also be specified as follows: the output power delivered for a maximum value of the control signal and a first value of the compensation signal is more than the output power delivered for a minimum value of the control signal and a second, higher value of the compensation signal.

Overlapping ranges, as summarised above, can ensure that there is always a steady-state solution near the boundary between ranges, and also avoid undesired gear shift caused by noise or crosstalk near the boundary of the gears. In cases where there is no overlap, if the load power just corresponds to the boundary of the two gears, small amplitude noise can cause continual gear shifts between the maximum power of the lower gear and minimum power of the higher gear. Over the manufacture spread of the primary control circuit or the transformer, it may occur that the maximum power of lower gear is lower than the minimum power of higher gear. As a result, a small "power gap" may appear. If the DC load power falls in this gap, the converter will continually shift gears, since there is no steady state solution. The use of overlapping ranges can help to avoid this.

In some embodiments, the compensation signal is continuously variable.

Here, continuously variable means that the compensation signal can assume and maintain substantially any value within a range. A contrast may be drawn with a discrete-valued signal, which can only step between discontinuous levels.

The primary control circuit may be adapted to add the compensation signal and the control signal, and to use the resulting summed signal to generate the driving signal.

In this case, the compensation is direct, in that the summed signal replaces the control signal for generating the driving signal. The compensation signal and the control signal both influence the same parameter of the primary control circuit.

The compensation circuit may be adapted to compare the control signal with a predetermined reference value and to generate the compensation signal based on the result of this comparison.

By means of the feedback loop, through the input and output sides of the SMPS and the secondary and primary control circuits, the compensation signal can bias the control signal toward the predetermined reference value. This means that the opto-coupler always tends to revert to a desired operating point, which can be chosen so as to reduce or minimise power consumption.

The compensation circuit may be adapted to generate the compensation signal based on low-pass filtering of the result of the comparison.

As a result of the low-pass filtering, the compensation signal can adapt to long term changes in the load. Meanwhile, short term changes in the load can cause the control signal to change in response.

Optionally, the primary control circuit may further comprise a boundary detector and corrector unit adapted to detect clipping of the control signal at a maximum and/or minimum voltage and, in response, to modify the compensation signal. For example, the boundary detector and corrector unit may set the compensation signal to a value of zero when clipping is detected.

According to another aspect of the invention, there is provided a SMPS comprising any one of the control circuits as summarised above.

In general, any of the control circuits summarised above may be used with any kind of SMPS. In some embodiments, the primary side of the SMPS is electrically (galvanically) isolated from the secondary side of the SMPS. In particular, this isolation may be provided by a transformer.

In any of the control circuits summarised above, the SMPS may comprise a flyback converter, or a resonant converter. A flyback converter is a buck-boost converter comprising a transformer for galvanic isolation. In a resonant converter a half bridge stage is applied to drive a resonant tank. In the resonant tank energy resonates between a capacitor and at least one inductor, while part of this resonating energy is delivered to a load. For mains isolation, the inductor may be replaced by a transformer. A well-known example of a resonant converter is an LLC converter.

The invention will now be described by way of example with reference to the accompanying drawings, in which.

Exemplary embodiments of the invention will now be described. These embodiments relate to a SMPS comprising a flyback converter. However, as those skilled in the art will appreciate, the scope of the present invention is not limited to flyback converters—this is simply used as a convenient example, for the purposes of explanation.

Figure 1:
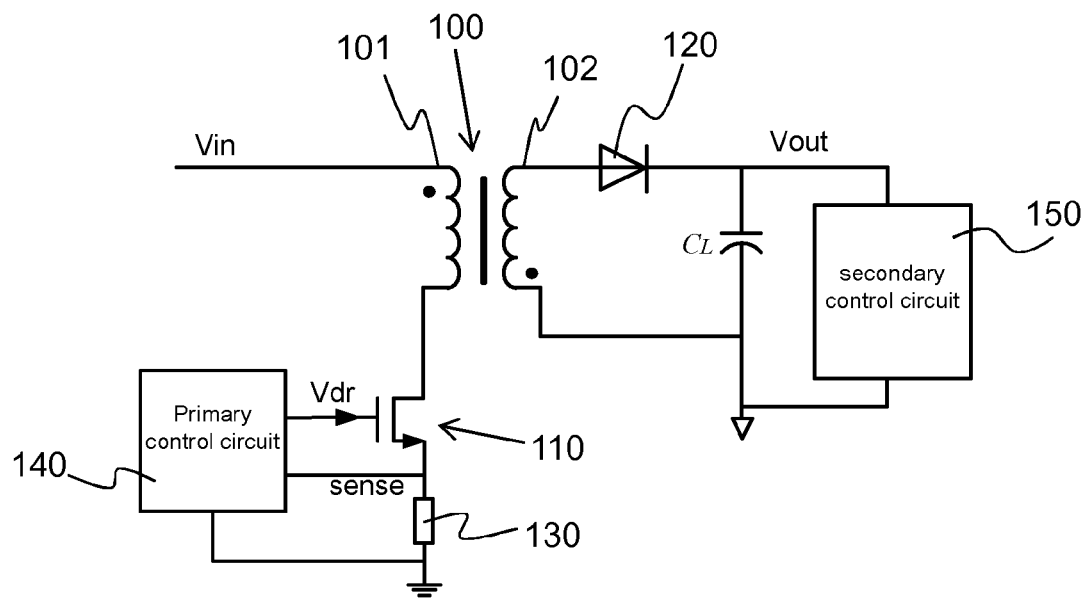
FIG. 1 shows a schematic circuit diagram for a Switched-Mode Power Supply (SMPS) with a flyback converter controlled by a control circuit according to an embodiment of the invention.

FIG. 1 shows a secondary sensed flyback converter operating with Discrete Conducting Mode (DCM). It consists of a transformer 100; power switch 110; a rectification diode 120; a load capacitor $C_L$; a sense resistor 130; a primary control circuit 140; and a secondary control circuit 150.

The switch 110 is connected in series with the primary side 101 of the transformer. In this embodiment, the switch is provided by a Metal Oxide Semiconductor (MOS) Field Effect Transistor (FET). The sense resistor 130 is connected to the source of the transistor 110. The voltage across the sense resistor 130 provides one input to the primary control circuit 140. The output of the primary control circuit 140 is a driving signal, which is connected to the gate of the switching transistor 110.

The rectifying diode 120 and load capacitor $C_L$ are connected in series with the secondary side 102 of the transformer. The output voltage of the SMPS is provided across the terminals of the capacitor. This voltage is monitored by the secondary control circuit 150. The secondary control circuit 150 is galvanically isolated from the primary control circuit 140; however, the circuits are adapted so that an output of the secondary control circuit 150 is optically coupled to an input of the primary control circuit 140. (This optical coupling is omitted from FIG. 1, for clarity.)

Figure 2:
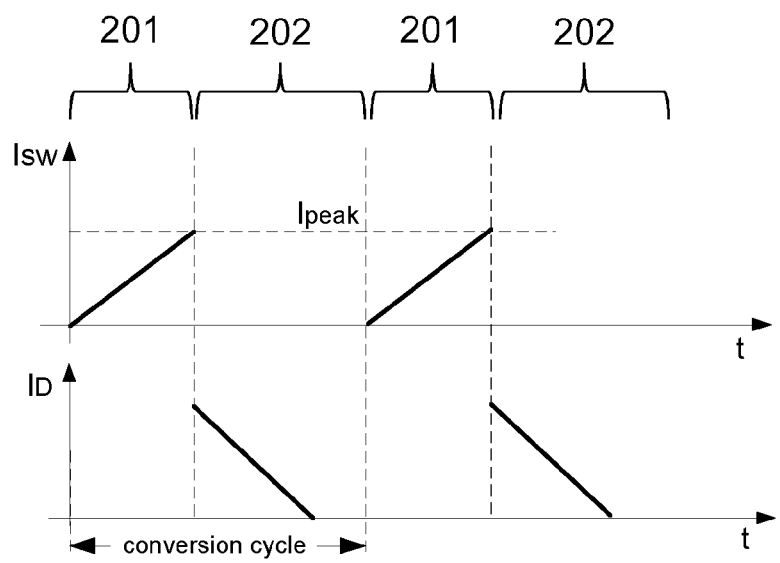
FIG. 2 illustrates a mode of operation of the SMPS of FIG. 1.

The timing diagram of the flyback converter of FIG. 1 is shown in FIG. 2. Here, $I_{sw}$ is the current flowing in the switch 110 and $I_d$ is the current in the diode 120. During the primary stroke 201 of each conversion cycle, the switch 110 is turned on, and the current of the switch as well as the primary current of transformer will increase. In this phase, energy is stored in the primary side 101 of transformer. Then, during the secondary stroke 202, the switch 110 is turned off, a decreasing current (related to the primary current of the transformer during the first stroke) will flow to the load through the diode 120, and the transformer 100 is being demagnetized. After the current flowing to the load drops to zero, the first stoke 201 starts again at a predetermined time instant. The power delivered to the load can be controlled by various parameters, such as the peak current, $I_{peak}$, which is reached during the primary stroke 201, the conversion frequency and so on. The conversion frequency is defined as the frequency with which the switch 110 is turned on.

Figure 3:
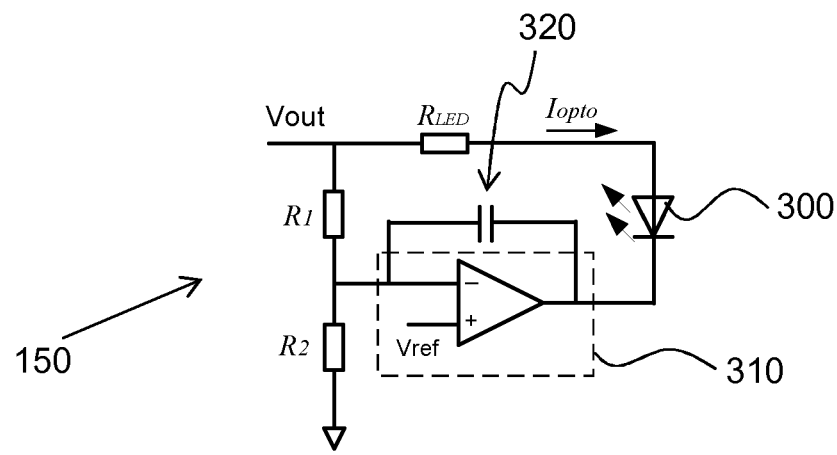
FIG. 3 shows a secondary control circuit suitable for the SMPS of FIG. 1.

The secondary control circuit 150 is shown in greater detail in FIG. 3. It comprises a resistive divider (R1, R2), a Light Emitting Diode (LED) 300, which forms one half of an opto-coupler, a resistor, $R_{LED}$, connected to the LED to set the gain, an error amplifier 310, and a capacitor 320 connected between the input and the output of the error amplifier. The output voltage of the converter is sensed by the resistive divider, and then processed by the error amplifier 310 that controls the current flowing through the LED. In particular, the error amplifier amplifies the difference between a voltage signal produced by the resistive divider (coupled to the inverting input of the amplifier) and a reference voltage, $V_{ref}$ (coupled to the non-inverting input). The current, $I_{opto}$, flowing in the LED determines its light emission. The emitted light intensity will be detected by the other half of the opto-coupler, in the primary control circuit 140, in order to control the power delivery. Thus, the secondary and primary control circuits together form a feedback loop from the output of the SMPS to the driving signal which controls the switch 110. The capacitor 320 stabilizes the entire feedback loop by providing a local negative feedback for the error amplifier. Due to the high DC gain of the error amplifier 310, the DC value of $V_{out}$ will be determined by the reference voltage ($V_{ref}$) in the error amplifier.

The secondary circuit monitors the output voltage of the SMPS. However, there is an error amplifier consisting of a opamp and a capacitor (shown in FIG. 3) in the feedback loop. The high DC gain of the error amplifier ensures a high DC loop-gain, which makes the output voltage almost independent of the load current. The capacitor in the error amplifier (shown in FIG. 3) is used to reduce the loop gain at high frequency, and thus stabilize the control loop.

In the present embodiment of the invention, the secondary control circuit 150 is similar to that of a conventional secondary-sensed SMPS. Likewise, the overall principle of operation of the flyback converter may be similar to a conventional SMPS. For this reason, the secondary control circuit and general operation of the SMPS will not be described in further detail here.

Figure 4:
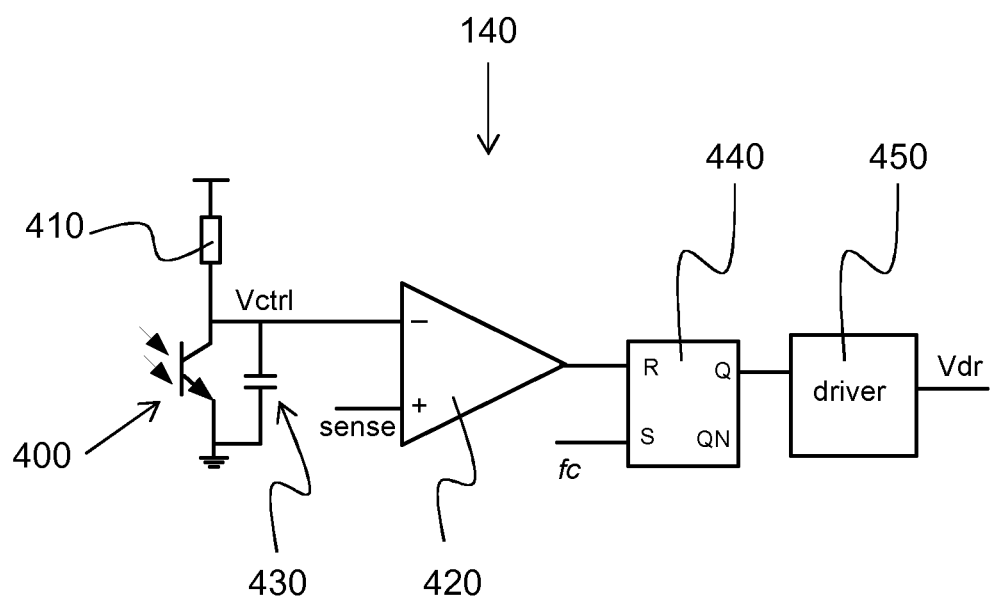
FIG. 4 shows a primary control circuit for the SMPS, according to a comparative example.

An exemplary conventional primary control circuit 140 is shown in FIG. 4. A lighting-controlled bipolar transistor 400 is connected in series with a resistor 410, in order to generate the primary control signal $V_{ctrl}$. The transistor 400 forms the other half of the opto-coupler, of which the LED 300 in the secondary control circuit forms the first half. When the LED 300 shines more brightly, more light falls on the lighting-controlled transistor 400, allowing a larger current to flow. This pulls the control signal, $V_{ctrl}$, lower. Conversely, when less light falls on the transistor, $V_{ctrl}$ will assume a higher value. A capacitor 430 is connected in parallel with the transistor 400, and is used for noise filtering for the control signal.

The control signal $V_{ctrl}$ is connected to the inverting input of a comparator 420, as a reference level to determine the peak current in primary side of the transformer. The non-inverting input of the comparator 420 is connected to the sense resistor 130. The output of the comparator 420 is coupled to the "Reset" input of an RS latch 440. The "Set" input of latch 440 is provided by a periodic square-wave signal fc. The output of the latch 440 provides the input to a driver circuit 450. In turn, the driver circuit 450 drives the gate of the power MOSFET 110 to make it turn on or off.

When the sense voltage (across the sense resistor 130) reaches $V_{ctrl}$ during the primary stroke, the comparator output will reset the RS latch, so as to turn off the switch 110. Then, the periodic signal fc will set the latch again at a predetermined moment to turn the switch 110 on again.

Figure 5:
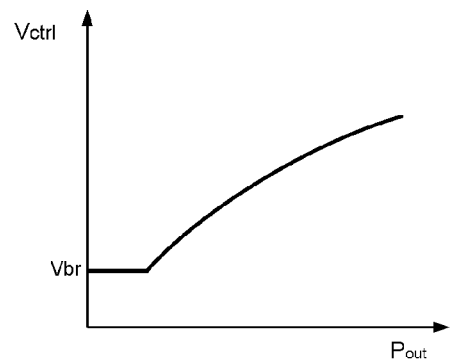
FIG. 5 is a sketch of a typical control signal vs. power characteristic of the SMPS.
Figure 6:
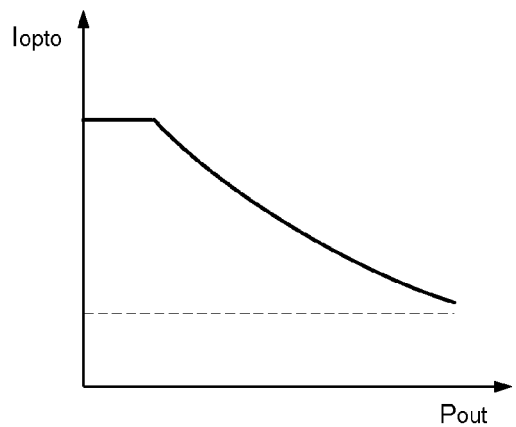
FIG. 6 is a sketch of a corresponding relationship between opto-coupler current and power.

The polarity of the secondary control circuit 150, shown in FIG. 3, determines that lower load power will correspond to lower values of the control signal $V_{ctrl}$ and higher current in the opto-coupler 300, 400. Likewise, higher load power corresponds to higher values of the control signal and lower opto-coupler current. This ensures negative feedback in the overall control loop for the converter. When the load power is very low, $V_{ctrl}$ will drop below a threshold level $V_{br}$, then the primary control circuit 140 will disable the power conversion. As a result, the output voltage will drop due to the load current, which makes $V_{ctrl}$ higher than the threshold again. Thus, at very low power, the power converter will work in a burst-mode, and $V_{ctrl}$ will be approximately equal to the threshold $V_{br}$ in steady-state. The graph of FIG. 5 shows an exemplary approximate relationship between the control signal and output power, for the conventional primary control circuit of FIG. 4. The corresponding relationship between opto-coupler current and output power is illustrated in FIG. 6.

In practice, the current in the opto-coupler 300, 400 always has a finite minimum required value to ensure proper operation. The horizontal dashed line in FIG. 6 indicates this minimum allowed opto-coupler current. With the control circuit configuration exemplified in FIGS. 3 and 4, this minimum current corresponds to the highest power that the converter will deliver. Consequently, in order to provide a wide range of output power levels, a high opto-coupler current will be drawn in the low-load or no-load condition. The energy dissipated due to this current can be a dominant factor in the no-load power consumption of the SMPS.

Nevertheless, the configuration of the secondary control circuit illustrated in FIG. 3 is desirable due to the availability of low-cost error-amplifiers, such as the TL431 manufactured by Texas Instruments. Therefore, changing the polarity of the secondary control circuit is not an acceptable solution, for many cost-sensitive products.

Figure 7:
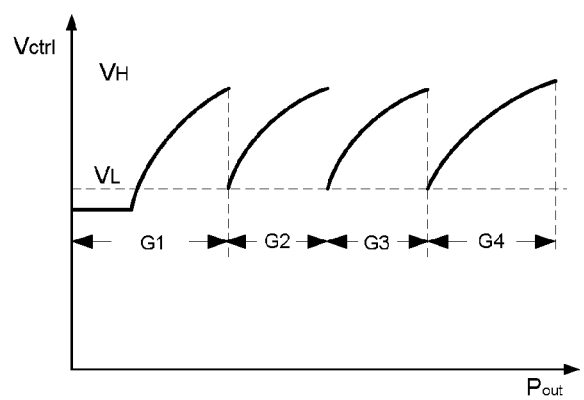
FIG. 7 shows a control-signal vs. power characteristic, having a plurality of "gears" according to an embodiment of a first aspect of the invention.

According to embodiments of the present invention, the primary control circuit is modified so that the DC range of the control signal $V_{ctrl}$ is reduced, which enables the opto-coupler to operate in a smaller current range from its minimum operating current. According to a first aspect of the invention, this is achieved by defining upper and lower limits, $V_H$ and $V_L$, for the DC value of $V_{ctrl}$ at least over the majority of the load power range and changing another parameter (or "gear") in the primary control circuit when $V_{ctrl}$ goes outside this range. If the required value of $V_{ctrl}$ to achieve a given power output is higher than the upper limit and the other parameter (or gear) has not achieved the value for the maximum power delivery, that parameter (or "gear") will have a step change, so as to deliver more power to the load. Similarly, if the required value of $V_{ctrl}$ is lower than the low limit and the other parameter (or gear) has not achieved the value for the minimum power delivery, this parameter or "gear" will have a step change to deliver less power to the load. As a result, due to the negative feedback of the whole converter, $V_{ctrl}$ will be well limited in the defined range at steady state, and this range of $V_{ctrl}$ can be much smaller than that with a conventional primary control circuit over the same load power range, due to the "gear" shifting. Therefore, the opto-coupler current at no-load can be significantly reduced, if the power converter is designed such that the highest value of $V_{ctrl}$ over the whole load power range corresponds to the minimum allowed opto-coupler operating current. With this approach, $V_{ctrl}$ as a function of load power is shown in FIG. 7, where each gear G1-G4 defines a certain range of power delivered to the load. In the example shown in FIG. 7, there are four gears.

Figure 8:
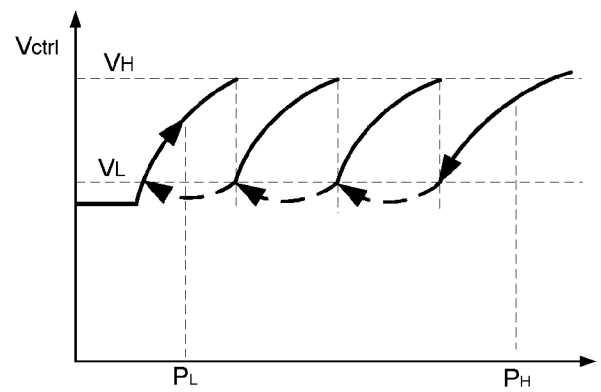
FIG. 8 illustrates a transition from a high power to a low power, with the characteristic of FIG. 7.

Since the "gear" shift can be immediate or very fast, the transient response time for large load steps may also be improved, since $V_{ctrl}$ can remain almost unchanged during a gear-shift. This is illustrated by the dashed arrows shown in FIG. 8, for a load step from a high load power PH, to a low load power PL. Note that part of the trace is omitted for $V_{ctrl}$ due to the gear-shifting—that is, the control voltage does not need to traverse from high to low in each intermediate gear. This provides an additional advantage (in addition to the reduction in the maximum opto-coupler current).

Figure 9:
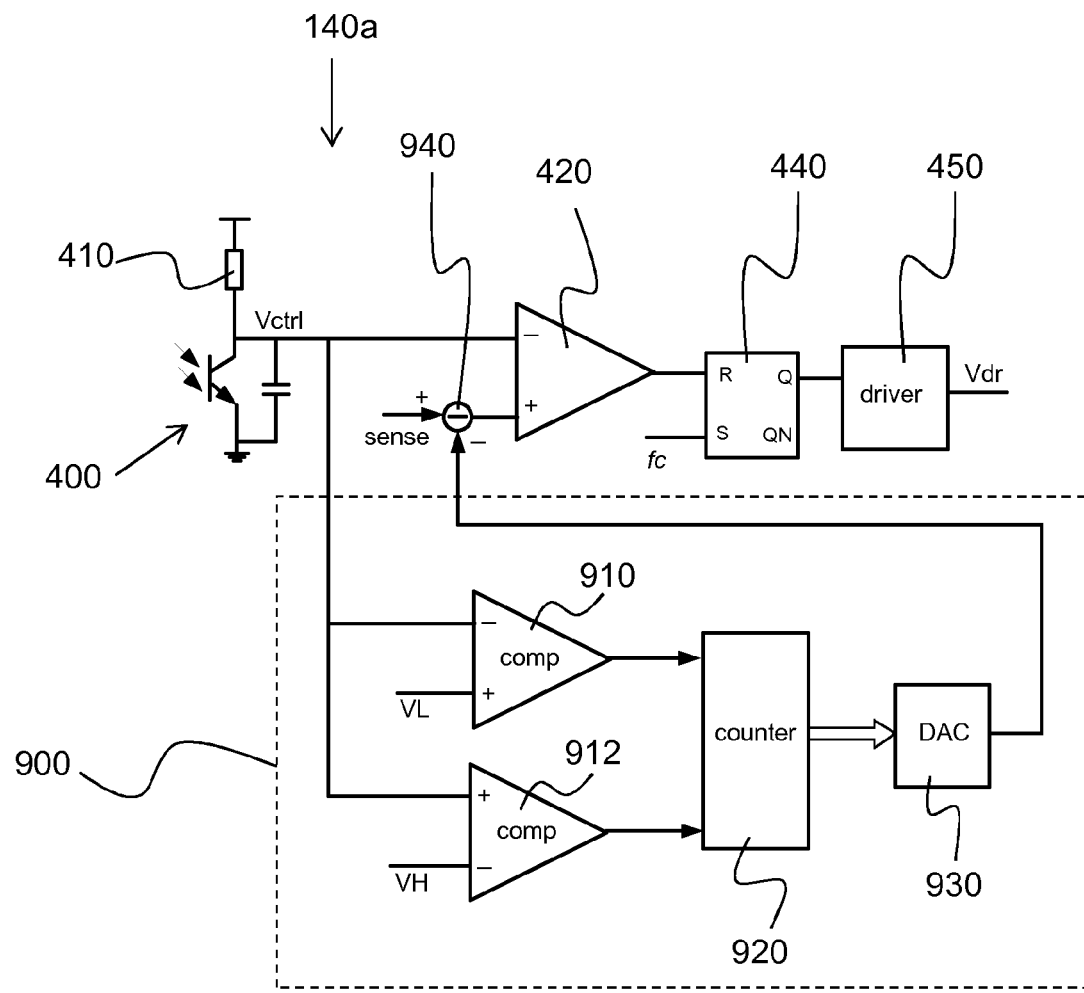
FIG. 9 shows a primary control circuit according to a first embodiment of the first aspect of the invention.

A first embodiment of a primary control circuit 140a according to this first aspect of the invention is shown in FIG. 9. In FIG. 9, components that are identical to the circuit of FIG. 4 are given the same reference numerals, and will not be described again.

In this embodiment, the peak current in the primary side of the transformer is used as the gear or parameter that is shifted to compensate for $V_{ctrl}$. A compensation circuit 900 is provided, to set the parameter. The input to this circuit 900 is the control signal $V_{ctrl}$; and the output is a compensation signal. The compensation signal is input to a subtractor unit 940, where it is subtracted from the sense signal. The output of this subtraction is input to the non-inverting input of the comparator 420. Consequently, in contrast to the conventional circuit of shown in FIG. 4, the primary control circuit of this embodiment differs in that the input to the comparator 420 is determined by the difference between the sense signal and the compensation signal, instead of being determined by the sense signal alone.

The compensation signal comprises two comparators 910 and 912. These are arranged to compare the control signal $V_{ctrl}$ with two reference levels, to determine if the gear needs to shift to higher or lower level. $V_{ctrl}$ is coupled to the inverting input of the first comparator 910; while the non-inverting input is coupled to the low threshold level $V_L$. $V_{ctrl}$ is also coupled to the non-inverting input of the second comparator 912; while the inverting input is coupled to the high threshold $V_H$.

A counter 920 receives the outputs of these two comparators. The counter determines the state of the gear-parameter by counting up or down. A positive edge from the first comparator 910 causes the counter to decrement; and a positive edge from the second comparator causes the counter to increment.

The output of the counter is coupled to the input of a Digital-to-Analogue Converter (DAC). This is operable to convert the counter output into an analogue signal which forms the compensation signal. By using a slow DAC, the gear shift may be made gradual.

Figure 12:
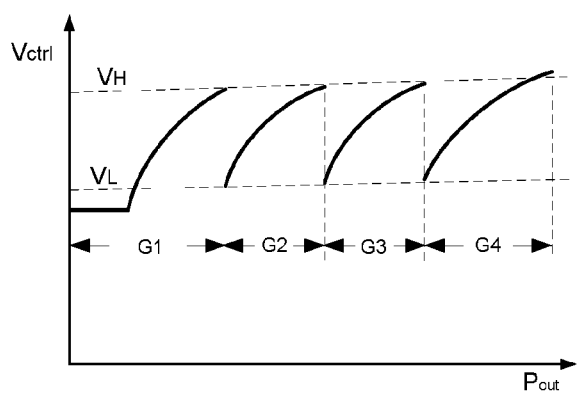
FIG. 12 shows an alternative to the characteristic of FIG. 7, with variable threshold voltages.

Alternatively, by using a fast DAC, the gear shift can be immediate. In some implementations, $V_H$ and $V_L$ can also be made variable by adding two extra DACs which convert the counter output into $V_H$ and $V_L$ separately. In this case, the thresholds $V_H$ and $V_L$ are dependent on the state of the gear as shown in FIG. 12. With different offsets added and/or different resolutions, the different DACs can convert the same input digital code (provided by the counter) into appropriate different analogue values.

Figure 10:
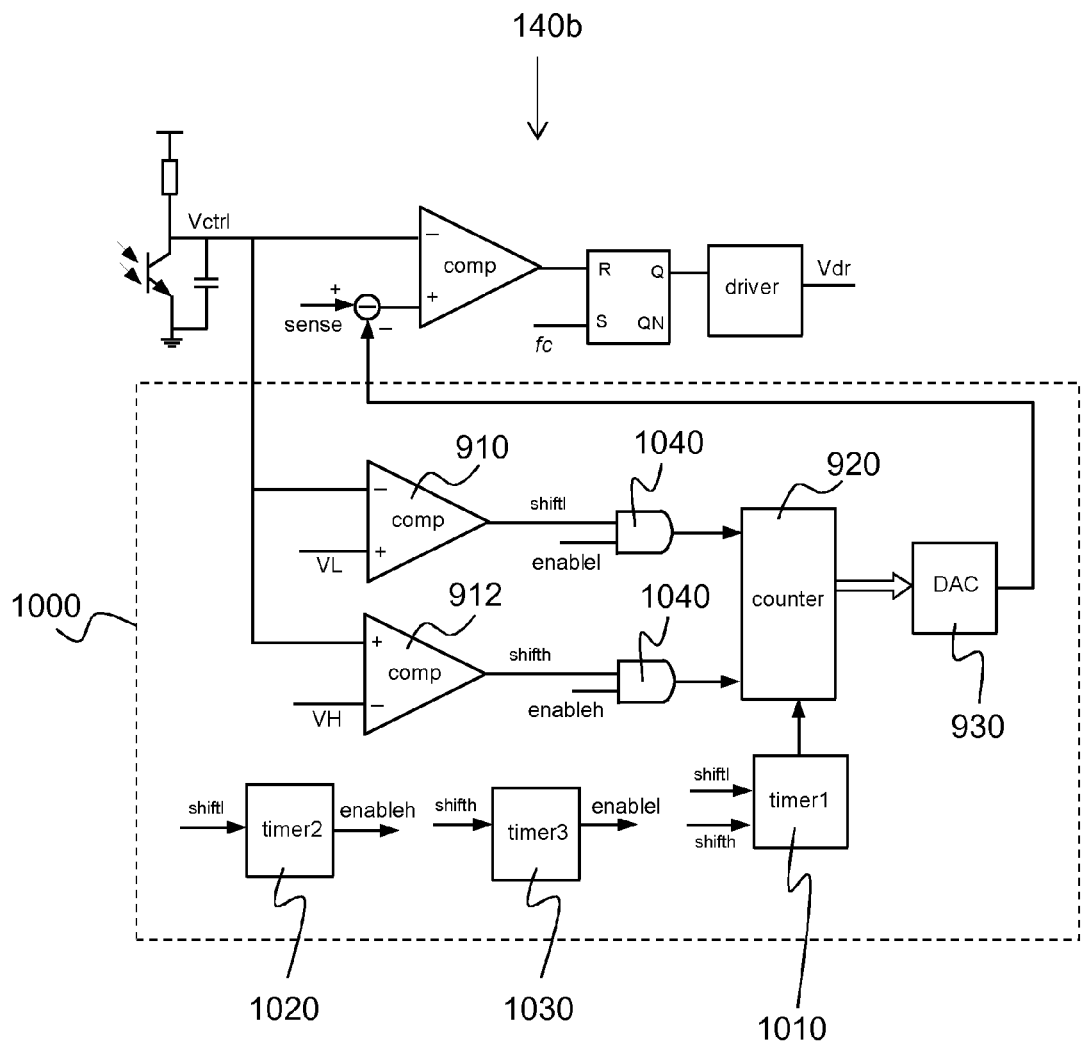
FIG. 10 shows a primary control circuit according to a second embodiment of the first aspect of the invention.

A second embodiment of a primary control circuit 140b, according to the first aspect of the invention, is shown in FIG. 10. The compensation circuit 1000 in this embodiment is similar to the embodiment of FIG. 9, with the addition of three timers 1010, 1020, 1030, to control when the gear-parameter can change. In particular, the timers disable gear shifts in some circumstances.

According to the circuit shown in FIG. 10, when shift or shiftl becomes high, the counter 920 will count up or down, respectively, so as to shift the gear. The first timer 1010 starts immediately after the gear-shifting. The output of the first timer is a control input to the counter 920. This timer 1010 stops after about 100 μs. At this instant, if the same input shifth or shiftl that triggered the timer is still high, the gear-parameter will be shifted further and the timer 1010 will be restarted. Otherwise, no further gear shift will happen. Thus, the first timer 1010 enables multiple shifts to happen in an orderly fashion, by preventing further increments or decrements until a predetermined time interval after the preceding increment or decrement, respectively. If $V_{ctrl}$ reverts back into the defined range within the delay time, a further gear shift is abandoned. Otherwise, gear will shift to further higher or lower level after the delay.

The other timers help to prevent oscillations. When shiftl becomes high, the gear-parameter will be decremented to one level lower. At this instant, the second timer 1020 will start and its output, enableh, will become low immediately. After a time interval, enableh will become high again. The output of the second timer is provided as an input to an AND gate 1040, the other input of which is provided by the signal shifth, from comparator 912. The output of the AND gate is coupled to the counter 920. In this way, the second timer disables an upward gear-shift (back to the previous, higher level) until after a time delay. Likewise, when shifth becomes high, the gear-parameter will shift to one level higher, the third timer 1030 will start and enablel will be low immediately, in order to disable a gear shift back to the previous (lower) level until after a time delay. In this embodiment, the time delay of the second and third timers is about 300 μs.

Figure 11:
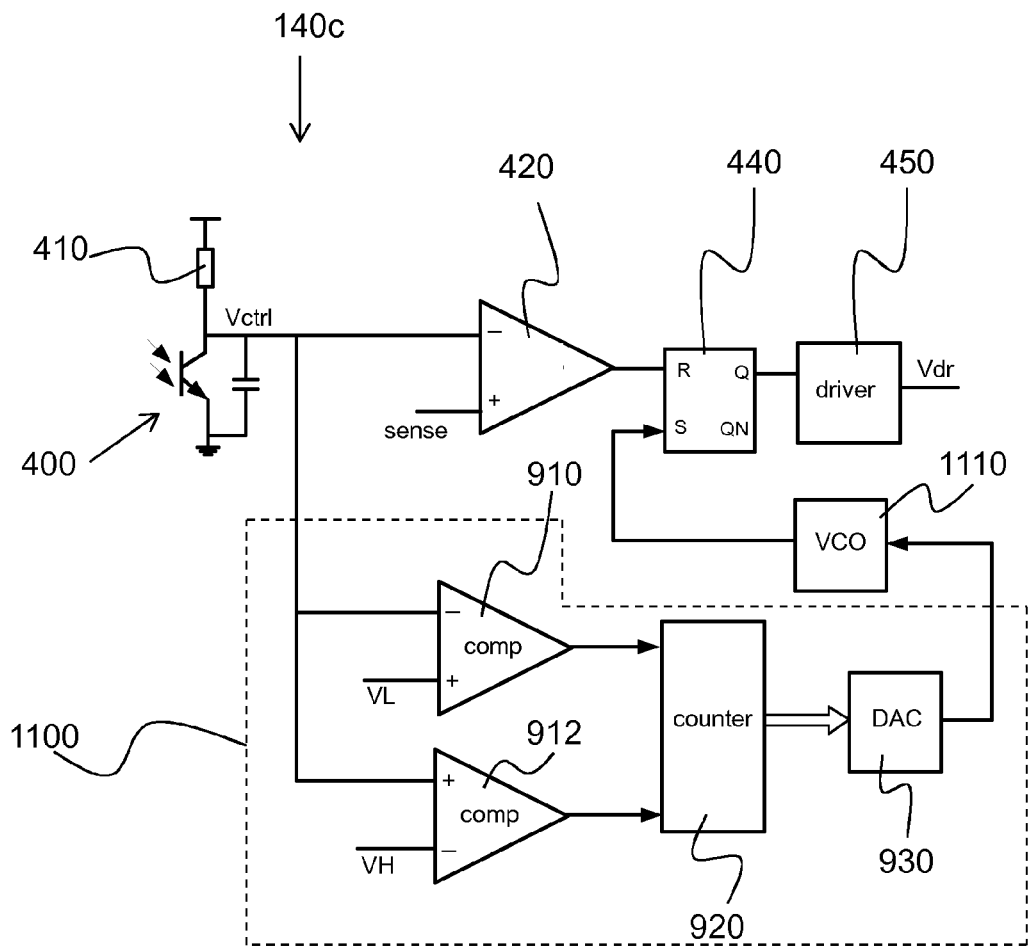
FIG. 11 shows a primary control circuit according to a third embodiment of the first aspect of the invention.

A third embodiment of a primary control circuit 140c according to the first aspect of the invention is shown in FIG. 11. Here, instead of peak current, conversion frequency is used as the gear parameter. The compensation circuit 1100 is configured similarly to the compensation circuit 900 of FIG. 9. However, the compensation signal output by the DAC 930 is used to drive a voltage-controlled-oscillator (VCO) 1110. The output of this VCO 1110 provides the signal fc that controls the "Set" input on the RS latch 440. Thus the compensation signal determines the frequency with which the switch 110 is turned on, and thereby the conversion frequency of the flyback converter.

As mentioned above for FIG. 9, by using a slow DAC 930, the gear shift can be made gradual. Alternatively, by using a fast DAC, the gear shift can be immediate. $V_H$ and $V_L$ can also be made variable by adding two extra DACs which convert the counter output into $V_H$ and $V_L$ separately. Also, timers can be added in exactly the same way as shown in FIG. 10 (and described above), to disable shifting of the gears under predefined conditions.

As those skilled in the art will appreciate, the embodiments described above are examples to show how the principles of the first aspect of the invention can be implemented. The scope of the first aspect is not limited to these examples. In particular, it is noted that any suitable number of gears can be chosen. Each gear corresponds to a signal-level of the compensation signal. In the examples above, the number of gears is determined by the counter: each value output by the counter corresponds to a different compensation signal level.

In the embodiments above, the "gear"-parameters chosen were the peak current in primary side of transformer and the conversion frequency respectively. However, other gear-parameters may also be chosen. In some embodiments, a combination of gear-parameters may be used. For example, both the peak current and the conversion frequency might be varied concurrently. In the embodiments above, the parameter used as the "gear" was uniform for all the gears. However, in other embodiments, different gears (G1, G2, etc.) may be provided by shifting different parameters. As mentioned, the shifting of the or each gear-parameter may be immediate, but could also be gradual.

Note that for all the embodiments shown above, $V_H$ and $V_L$ were uniform for all gears—that is, over the whole power-range. However, this is not essential. For example, as shown in FIG. 12, $V_H$ and $V_L$ may increase (in particular, linearly) over the whole power range.

Figure 13:
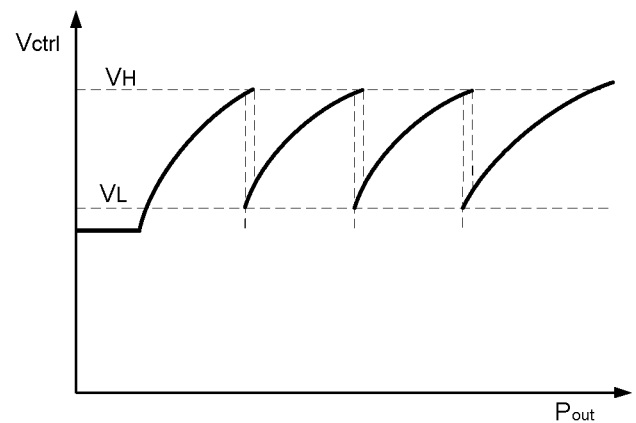
FIG. 13 shows a further alternative characteristic, wherein the power ranges of successive gears overlap.

Note that for the embodiments described above, the maximum power of each lower gear was identical to the minimum power of the next-higher gear. This is not essential. Indeed, it may be desirable in some cases to provide some "hysteresis", whereby the power-ranges of the gears overlap over some finite range. For example, the minimum output power of a gear $G_n$ may be lower than the maximum output power in the adjacent lower gear $G_{(n-1)}$. This is illustrated in FIG. 13. The benefit of this overlap is that it can avoid repeated shifts between two adjacent gears when the load power happens to fluctuate near to the boundary of the two gears: for example, after a shift to a higher gear is triggered, it is possible for the power consumption in the load to reduce slightly (below the power-level at which the upward-shift was triggered) without triggering a shift back to the lower gear. This approach can be used in addition to the use of time-delays to prevent undesired gear-shifting. As summarised previously above, the use of overlap can also help to mitigate the effects of process-spread, by helping to avoid gaps between the maximum power of one gear and the minimum power of a higher gear.

According to a second aspect of the invention, the DC range of the control signal $V_{ctrl}$ is reduced in a different way. Instead of shifting an independent parameter of the primary control circuit, the circuit includes an adaptive offset which is added to the control signal and the combined signal is then used to control the output power.

Figure 14:
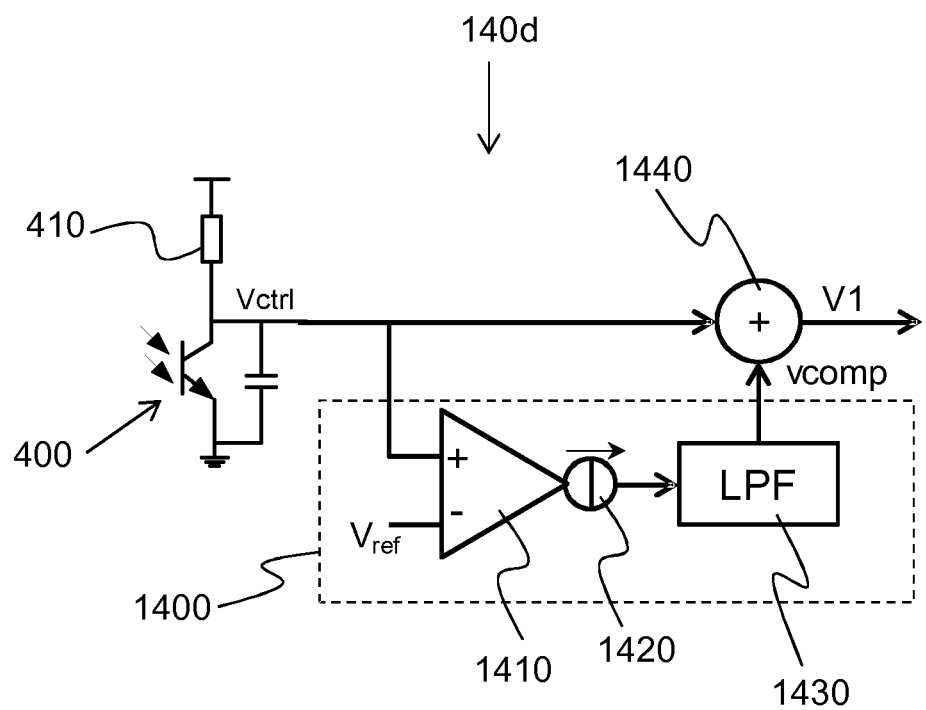
FIG. 14 shows a primary control circuit according to a first embodiment of a second aspect of the invention.

A first embodiment of a primary control circuit 140d according to the second aspect of the invention is shown (in part) in FIG. 14. In this embodiment, an offset is added to the control signal $V_{ctrl}$ by a summation block 1440. In particular, a compensation circuit 1400 is provided, which produces a compensation signal, vcomp, to be added to the control signal by the summation block 1440. The compensation circuit comprises a transconductance amplifier 1410, with a current source output 1420 and a Low-Pass Filter (LPF) 1430. The input to the compensation circuit is the control signal $V_{ctrl}$. This input is provided to the non-inverting input of the amplifier 1410. A reference voltage $V_{ref}$ is provided at the inverting input of the amplifier. The output of the amplifier 1410 is a current source 1420. This in turn is coupled to the input of the filter 1430. The low-pass filtered output signal is the compensation signal, which is provided to the summation block 1440 of the primary control circuit. Note that the compensation signal in this example is continuously variable.

The amplifier 1410 creates an error signal based on the difference between the reference $V_{ref}$ and the instantaneous value of the control signal $V_{ctrl}$. Due to the low pass filter after the amplifier, the compensation signal will be slowly regulated to a value that ensures that $V_{ctrl}$ equals $V_{ref}$. This regulation occurs because of the feedback pathway through the power supply. This gives a steady state characteristic in which $V_{ctrl}$ always returns to a uniform desired value $V_{ref}$ over a long time interval. Over a shorter time interval, however, the low pass filter prevents compensation signal from changing suddenly. Therefore, for the short term dynamic relationship between $V_{ctrl}$ and output power, the original gain is maintained, allowing for the desired loop specification—for example, in terms of stability and dynamic response. The compensation circuit can be understood as providing a parallel feedback pathway, with a slower time constant. The time constant of this second feedback path should be chosen such that the stability of the main loop (based on $V_{ctrl}$) is not significantly affected by the second pathway. The time constant can be adjusted by the gain and frequency dependent behavior of the second feedback path.

In this embodiment, using a transconductance amplifier, the LPF includes a capacitor. Assuming the main regulation loop of the SMPS is much faster than the adjusting loop, the timeconstant is defined by the product of 1/transconductance of 1410 (1/GM) and capacitor in the LPF. This can be understood by assuming V1 is constant (belonging to a certain output power and a fast loop) as V1 is constant, a variation deltaV at the compensation output (vcomp) should induce −deltaV at Vctrl, effectively giving a minus 1 gain from compensation signal to Vcontrol and therefore a loop-gain of the local loop equal to GM×1/(jwC) and transfer from Vref to compensation signal vcomp/Vref=gm/jwC/[1+gm/jwC]=1/[1+jwC/GM] giving Tau=C/GM The fixed steady state value for $V_{ctrl}$ reduces the current consumption at no load, because the resistor at the optocoupler output can now be chosen according to a single desired opto-coupler current, which is valid for both high and low loads.

The output of the summation block (adder) 1440 is provided to the remaining part of the primary control circuit. Comparing FIG. 14 with the conventional primary control circuit of FIG. 4, it can be seen that the combined signal V1 replaces the control signal $V_{ctrl}$ at the input to the comparator 420. However, as those skilled in the art will appreciate, the compensation circuit 1400 and adder 1440 shown in FIG. 14 can be used in a variety of other suitable primary control circuits for switched mode power supplies. In all such embodiments, the combined signal V1 produced by the adder 1440 can replace the direct use of the control signal $V_{ctrl}$ output by the opto-coupler.

Figure 15:
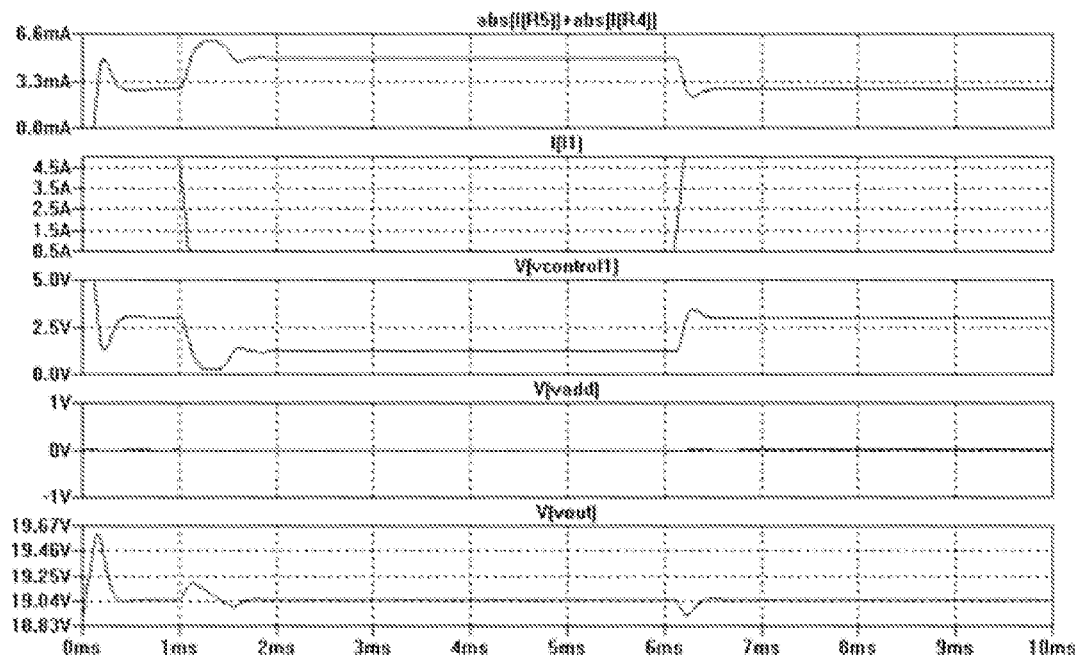
FIG. 15 is illustrates the operation of a SMPS according to a comparative example.
Figure 16:
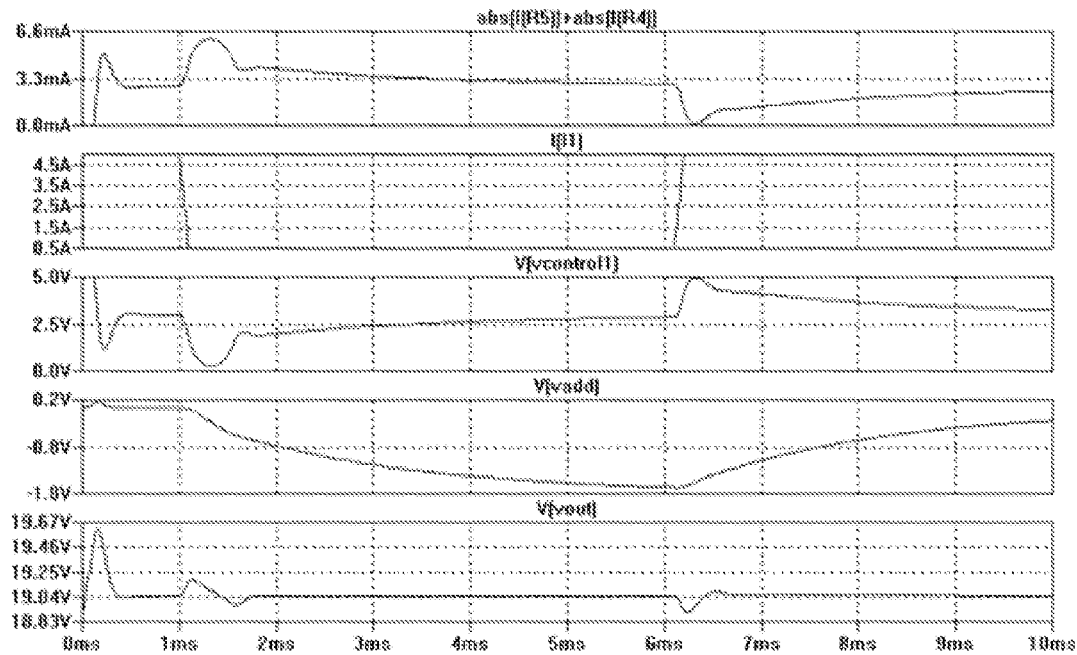
FIG. 16 illustrates the operation of a SMPS with the primary control circuit of FIG. 14.

FIGS. 15 and 16 show the results of simulations of an SMPS based on the primary control circuit of FIG. 14. In greater detail, the parameters of the circuit are as follows:
$C_L$: 1000 µF
R1: 100 kΩ
R2: 150 kΩ
$R_{LED}$: 1 kΩ
Feedback capacitor 320, in secondary control circuit: 200 pF
Resistor (not shown in FIG. 3) connected in series with this capacitor: 500 kΩ
Resistor 410, in series with light-controlled transistor: 1.5 kΩ

In the simulation, the SMPS was represented by a current source that models the transfer from control input to output current, as delivered to the output electrolytic capacitor of the SMPS ($C_L$). $V_{ref}$, which determines the control signal $V_{ctrl}$ in steady state operation, was set to 3V.

The error loop of FIG. 3 can alternatively be implemented in a slightly different way. The gain can be set by Rled only and killing the gain of 310 by adding a large capacitor. It is also possible to let 310 determine the gain together with Rled. Then the compensation network around 310 can for example be a capacitor in series with a resistor and optionally a second capacitor in parallel. Nevertheless, as those skilled in the art will appreciate such implementation details do not change the basic idea of the invention.

FIG. 15 shows the results when the compensation circuit 1400 is disabled, as a comparative example. This corresponds to the operation of the circuit illustrated in FIG. 4. The first (top) plot shows the total opto-coupler current; the second plot shows the load current; the third plot shows the control signal $V_{ctrl}$; the fourth plot shows the compensation signal; and the fifth (bottom) plot shows the output voltage $V_{out}$.

At a time t=1 ms, the load steps from a high load to low load. This is seen in the load current in the second plot. It can be seen clearly that the total opto-coupler current increases in response to this reduction in the load. The total opto-coupler current is the sum of the input current and output current of the opto-coupler. The control signal $V_{ctrl}$ drops in conjunction with the increase in the opto-coupler current.

FIG. 16 shows the corresponding results when the adaptive offset provided by the compensation circuit 1400 is activated. Initially, after the step in the load, the opto-coupler current increases, but thanks to the slow, adaptive part, the current in the opto-coupler gradually returns to the same steady-state value, independent of the load. Meanwhile, the dynamic performance of the loop is not altered.

Figure 17:
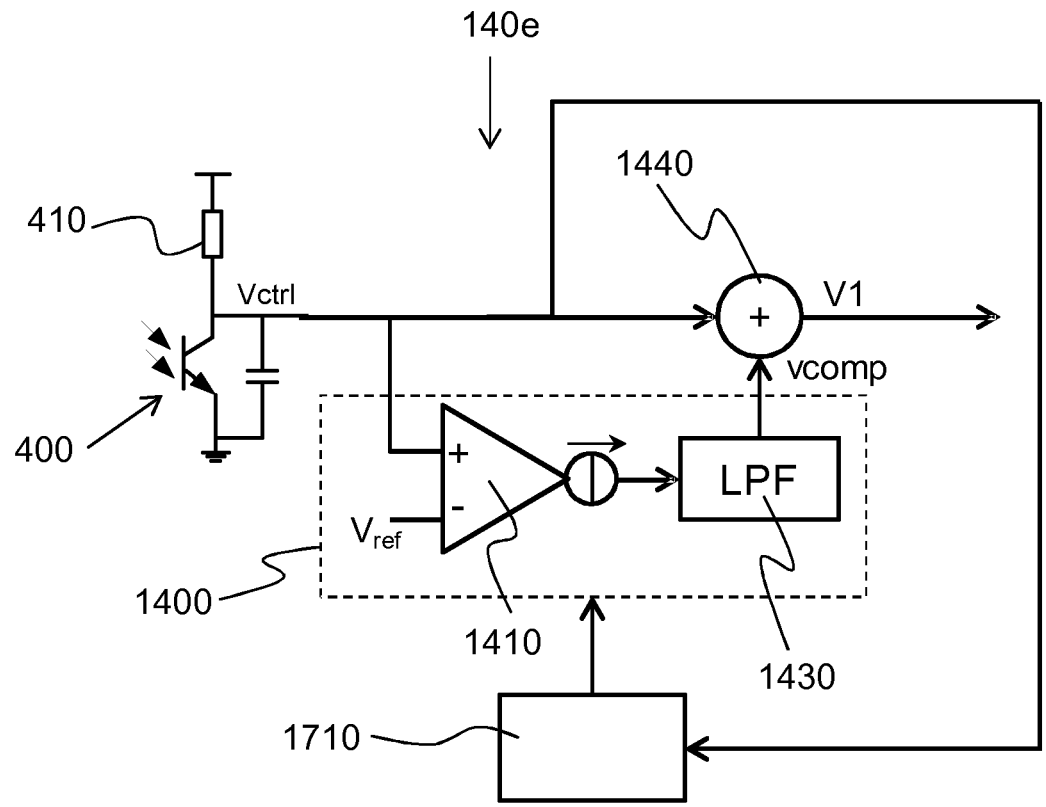
FIG. 17 shows a primary control circuit according to a second embodiment of the second aspect of the invention.

An optional additional feature of the second aspect of the invention concerns a correction to the compensation signal when the clipping of the control signal occurs. As the compensation signal adds an offset to the control signal, the risk is increased that as a result of a step-change in the load, Vctrl could clip. In order to prevent this problem, a boundary detector and corrector block 1710 is added to the adaptive part of the compensation circuit. This is shown in a second embodiment of the primary control circuit 140e, according to the second aspect of the invention, as illustrated in FIG. 17. The boundary detector can detect the clipping situation and can change the instantaneous offset generated by the compensation circuit. The offset can for example be made 0 when a clipping situation is detected.

The boundary detector detects when Vctrl reaches an upper or lower edge of the operating window. In response, the value of the compensation signal is overruled by a correction mechanism in order to maintain V1 within the edges of the desired operation window. The correction mechanism is based on the difference between an edge of the operating window and the value of Vctrl. The implementation of the boundary detector and correction block 1710 will be within the capabilities of one skilled in the art. For example, a transconductance amplifier with only one direction of current flow could be used, where current is put into the capacitor or drawn from the capacitor of the LPF when a border is crossed and with a current proportional to the difference between Vctrl and border. This could be implemented by 2 amplifiers, one for an upper limit and one for a lower limit. In other embodiments, a digital counter counting up or down proportional to vref-vctrl followed by an AD converter is possible. In this case, the correction mechanism should be based for example on adapting the counter.

According to a third aspect of the invention, the opto-coupler current is reduced in yet another way. According to embodiments of the third aspect, the compensation circuit provides an additional feedback loop between the control signal which determines the power output and the opto-coupler. This separate loop regulates the current in the opto-coupler to a desired (often, but not necessarily fixed) level over a long time, but for high frequency changes, the original characteristic of increasing current when reducing Vcontrol is used, in this way preventing a potential instability problem of the main regulation loop.

In one part of the third aspect of the invention, the transfer from the output current of the opto-coupler to the control variable of the SMPS is given a specific behaviour in order to reduce the current in the opto-coupler at low load levels of the SMPS, without negatively influencing the stability of the regulation loop of the SMPS. With respect to this transfer, a distinction between current domain and voltage domain representation can be made. Therefore a basic schematic diagram of the primary control circuit of the SMPS will be explained. Embodiments can be grouped in two categories, based on either a current domain or a voltage domain representation.

Figure 18:
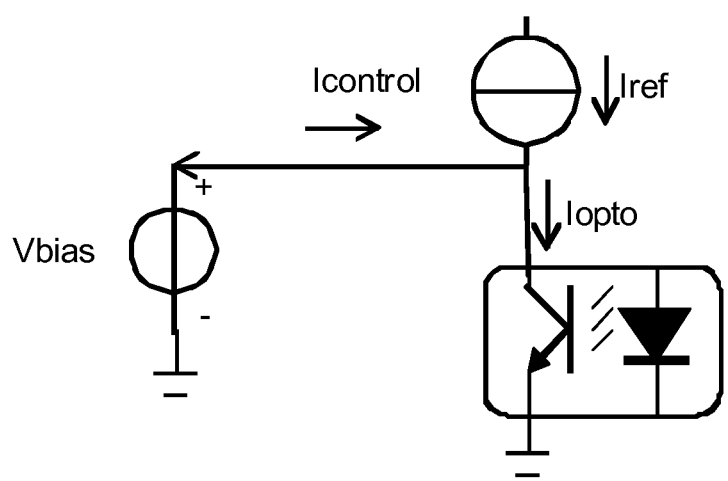
FIG. 18 shows a schematic diagram of a current domain representation for embodiments according to the third aspect of the invention.

In the current domain representation, illustrated in FIG. 18, the current Icontrol is the control signal controlling the converted power. The bias voltage Vbias is necessary to define a proper voltage to keep the opto-coupler output out of saturation. The opto-coupler current is the sum of a reference current, Iref, generated by a current source and the control current Icontrol.

Figure 19:
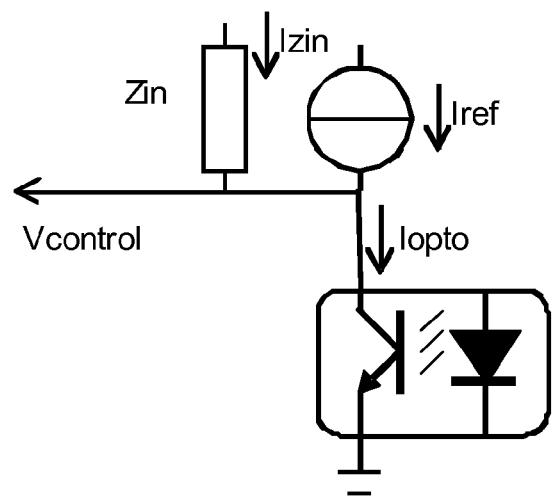
FIG. 19 shows a schematic diagram of a voltage domain representation for embodiments according to the third aspect of the invention.

In the voltage domain representation, shown in FIG. 19, the voltage Vcontrol is the control signal controlling the converted power level. In the voltage domain representation, an element Zin is necessary to convert the opto-coupler current, Iopto, to a voltage.

As already explained, it is desired to keep the current Iopto at a low level at no load. As Iopto is largest at no load, while at any operating point a current above a lower limit is required, it is desired to keep the current Iopto constant over all values of Vcontrol. However, with such a constant current, the gain from Iopto to Vcontrol would become infinite, giving stability problems for the SMPS. A way to prevent instability is now to make Iopto constant with respect to the control signal only for steady-state (DC). For higher frequencies Iopto can follow the normal behaviour as determined by Icontrol, in the current domain representation; or Iref+Izin=F(Vcontrol), for the voltage domain representation. Therefore, the loop-gain of the SMPS is well defined for the frequencies that define the stability requirements. (frequency for 0 dB loop-gain). For the current-domain representation of FIG. 18, this means that for high frequencies, Iref+Icontrol should be kept constant and equal to the desired current Iopto_ref. For the voltage domain representation of FIG. 19, this means that Iref+IZin should be kept constant and equal to the desired current Iopto_ref.

Figure 20:
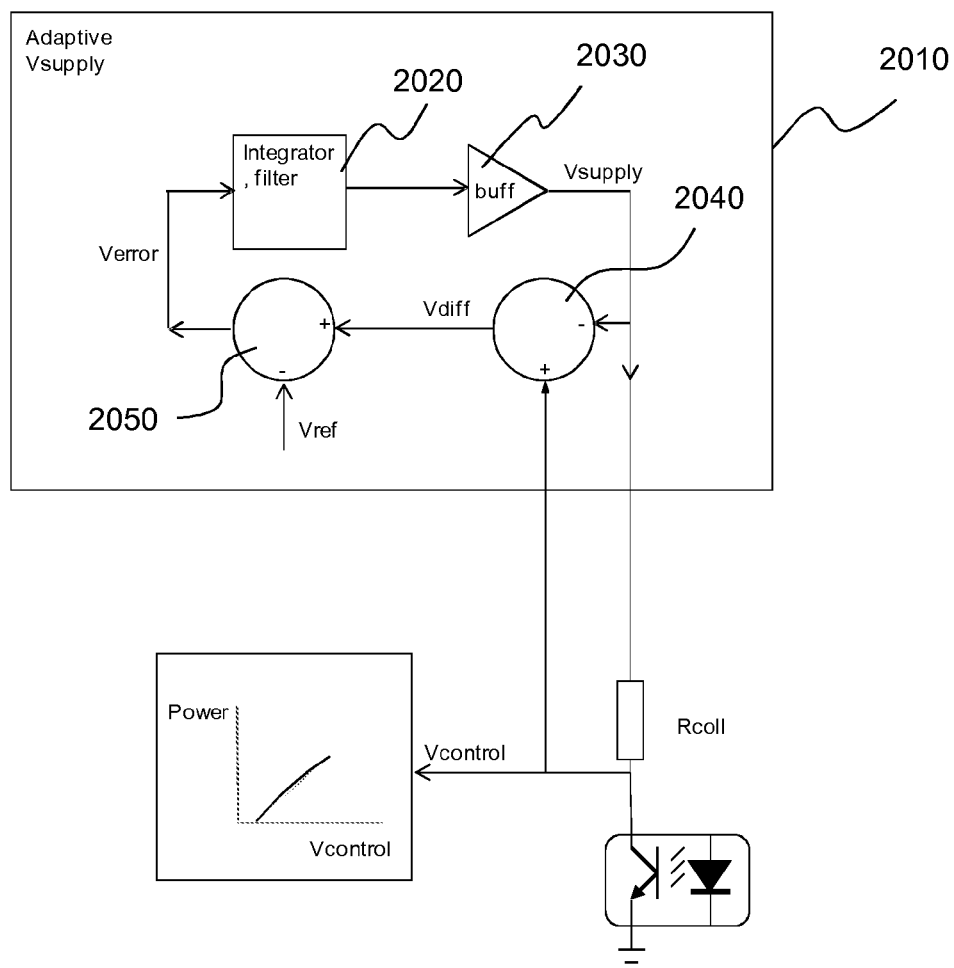
FIG. 20 is a schematic diagram of a primary control circuit according to first embodiment of the third aspect of the invention.

A first embodiment according to the third aspect of the invention will now be described, with reference to FIG. 20. This embodiment is derived from the voltage domain representation. The current Iref+IZin is defined by a single resistor Rcoll connected to a supply voltage Vsupply. The compensation circuit comprises adaptive voltage supply 2010 for the opto-coupler. The input to the compensation circuit 2010 is the control voltage Vcontrol. The compensation signal output from the circuit 2010 is the supply voltage Vsupply. A first subtractor block 2040 subtracts the supply voltage from the control voltage to generate a difference voltage Vdiff. This provides one input to another subtractor block 2050, which subtracts a reference voltage Vref from the difference Voltage Vdiff. The result of this subtraction is an error voltage Verror, which is input to an integrator filter 2020. The output of the integrator filter is input to a buffer 2030, which produces the supply voltage.

The current in the series resistor Rcoll is regulated to a desired DC value by taking the difference Vdiff=Vsupply−Vcontrol and creating an error signal Verror, being Vdiff−Vref and integrating this Verror to get the voltage Vsupply. Due to the integrator action, Verror is regulated to 0 in DC giving Vsupply−Vcontrol=Vref giving Iopto=Vref/Rcoll and an input impedance of infinity. Meanwhile, for higher frequencies, Vsupply cannot be adapted that fast. This results in an input impedance of Rcoll. In general, using an integrator with time constant Tau according to $$Vsupply = \frac{1}{Tau} \cdot \int Vcontrol - Vsupply - Vref \, dt \quad (1)$$

The input impedance in the laplace domain can be calculated as:

$$Zin = \frac{Rcoll \cdot (1 + Tau \cdot s)}{Tau \cdot s} \quad (2)$$

Figure 21:
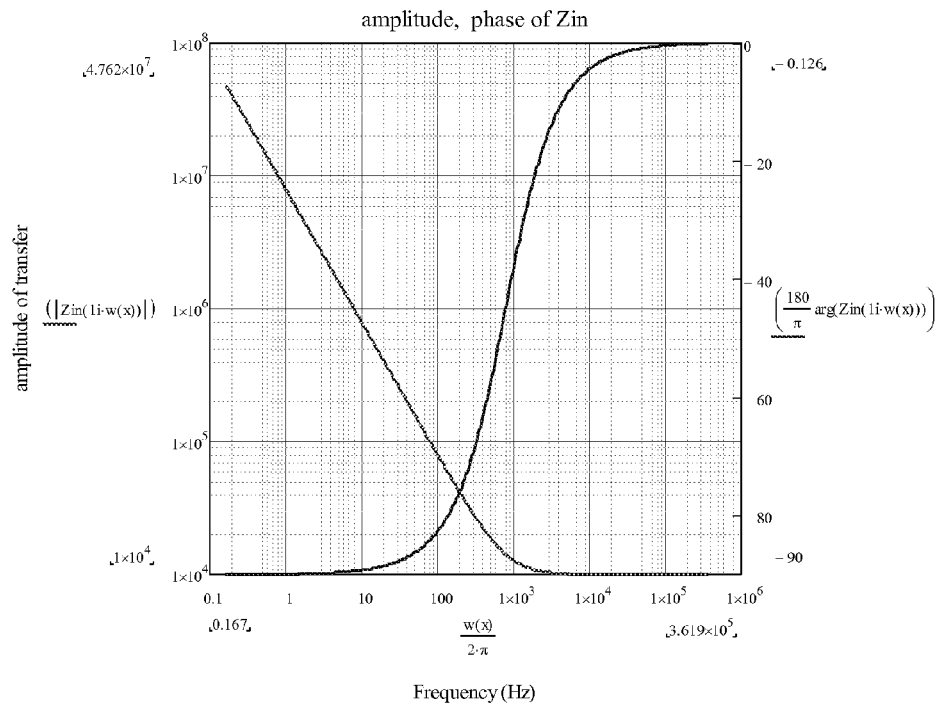
FIG. 21 is a plot of the complex input impedance of the primary control circuit of FIG. 20.

The impedance curve is plotted in FIG. 21 for an example with Tau=200 us and Rcoll=10 k. The plot clearly shows that the impedance behaves as a resistor of 10 k for frequencies significantly above F=1/(2·pi·Tau)=800 Hz. This means that for the loop stability where the value of Zin at 0 dB loop-gain (usually at a frequency of approx 3 kHz or higher) the network can be replaced by a resistor of 10 k as if a simple 10 k resistor was used, while still the advantage of a constant opto-coupler current remains (instead of an increasing opto-coupler current when Rcoll is really a fixed resistor of 10 k).

Figure 22:
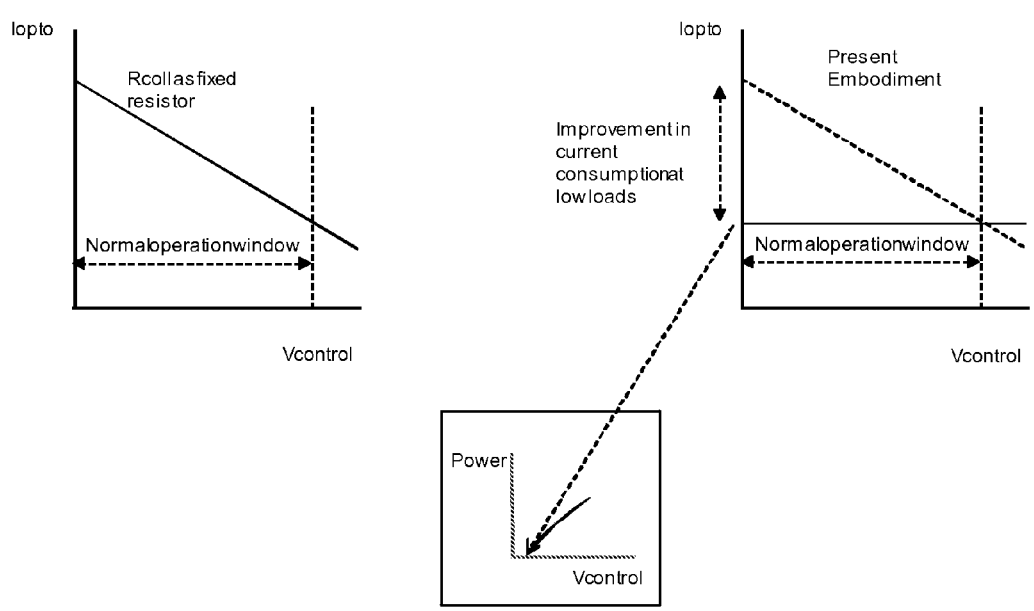
FIG. 22 illustrates schematically how the primary control circuit of FIG. 20 is able to reduce power consumption in the SMPS at no-load.

This effect can be explained with reference to FIG. 22. For low power levels, Vcontrol needs to be low. As can be seen FIG. 22, the constant opto-coupler current gives a significant improvement in the current consumption at the output of the opto-coupler. A typical example of a prior art control block with a maximum control voltage of 5V and a minimum current of 100 uA includes a resistor of 20 kohm, supplied from a 7V DC source. At low loads, the voltage drops to 0V, giving a current of 350 uA. With a worst case CTR of 0.2, which is a practical value at such low bias-current levels, the dissipation by the communication circuit of a 19V adapter is already 19V×350 uA/0.2=33 mwatt at the diode side and 15V×350 uA=5 mWatt at the opto-coupler output side (assuming a 15V IC supply voltage). On the other hand, calculating the power consumption for the present embodiment gives: primary side dissipation=15V×100 uA=1.5 mW; and secondary side dissipation=19V×100 uA/0.2=9.5 mW, giving a total dissipation of 11 mwatt. This means that the present embodiment allows for a no-load input power below 30 mw, while prior art solutions are not able to realize this.

Figure 23:
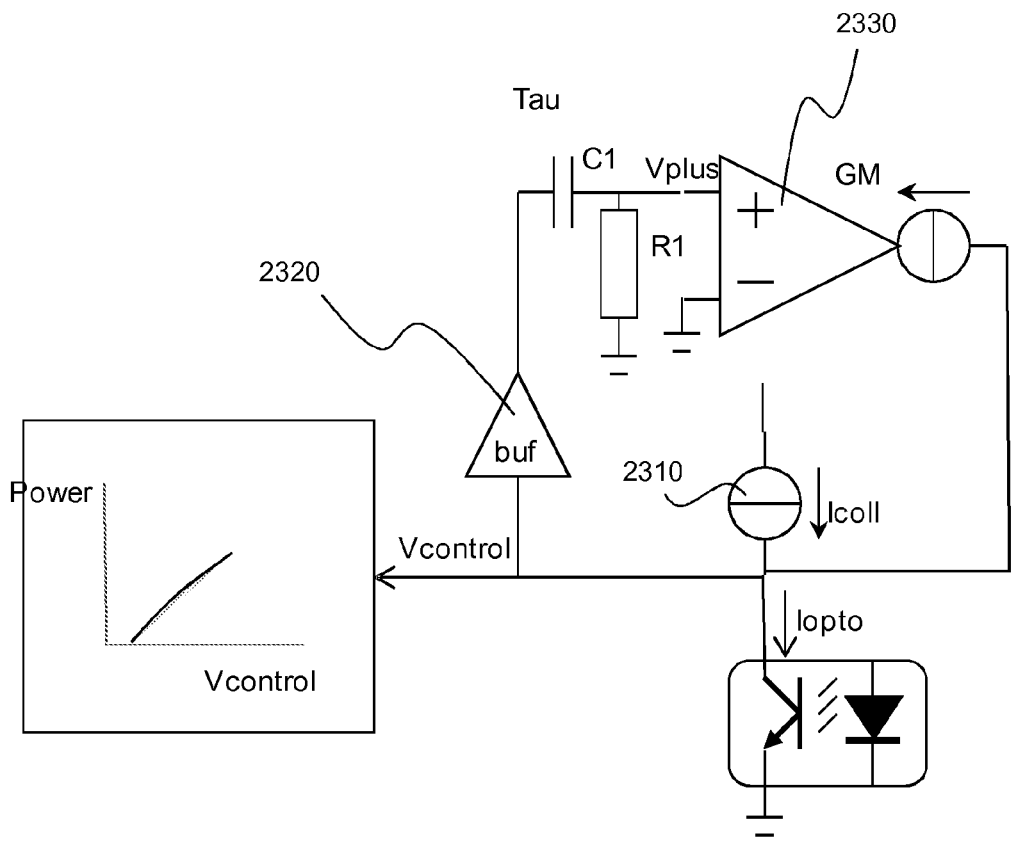
FIG. 23 is a schematic diagram of a primary control circuit according to a second embodiment of the third aspect of the invention.

A primary control circuit according to a second embodiment of the third aspect of the invention will now be described, with reference to FIG. 23. In this example, the impedance at the output of the opto-coupler is formed by a fixed current source 2310 drawing the desired current Icoll. In order to achieve the desired resistive behaviour for high frequencies, a transconductance amplifier 2330 with transconductance GM and a differentiating network is used. The output currents of the fixed current source 2310 and the transconductance amplifier 2330 are coupled together in parallel, in series with the opto-coupler. The control voltage Vcontrol is the output of the opto-coupler, as in the previous embodiment. The control voltage is input to a buffer 2320, which in turn provides the input to the differentiating network. The network comprises a capacitor C1 and resistor R1 in series. The non-inverting input Vplus of the transconductance amplifier 2330 is coupled to the node between the capacitor and resistor. The inverting input is coupled to ground. The differentiating network has time constant Tau=R1·C1. This gives a similar impedance as the embodiment used in equation (2) while GM=1/Rcoll $$Zin = \frac{1}{GM} \cdot \frac{1 + s \cdot Tau}{s \cdot Tau} \quad (3)$$

A primary control circuit according to a third embodiment of the third aspect is described with reference to FIG. 24. This embodiment uses the current domain representation of FIG. 18. In this case, the desired current source behaviour is realized by making the current Iref a function of Icontrol (preferably Iref=Ioptoref−Icontrol) so that Iopto becomes constant, having the same value for each operating point of Icontrol.

Figure 24:
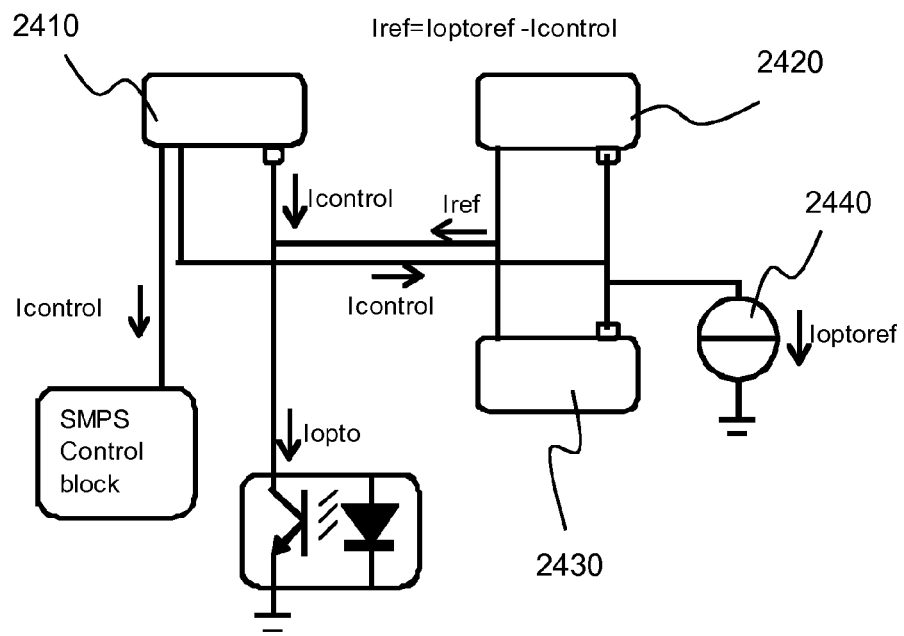
FIG. 24 is a schematic diagram of a primary control circuit according to a third embodiment of the third aspect of the invention.

The circuit of FIG. 24 is based on the use of current mirrors 2410, 2420, 2430. A current mirror input, as indicated by the square, conducts in one direction and is then low-ohmic and can be described by a voltage source. This voltage source relates to the MOS transistor diode characteristic of an input transistor. This is the relation between gate source voltage and drain current for a MOS transistor connected as diode—that is, with the drain connected to the gate, similar to a bipolar diode that can be obtained by taking a bipolar transistor and connecting the collector to the base The output is high-ohmic and represents a current source being the input current scaled by a scaling factor, being 1 in this case. A current mirror can have several outputs.

A current source 2440 is connected to the input of two current mirrors 2420 and 2430. As both inputs of mirror 2420 and mirror 2430 are connected together, the supply voltage of both mirrors is chosen such that a certain bias current flows in both inputs and outputs.

The input of a third current mirror 2410 is connected to the optocoupler output and the Iref output of the mirrors 2420 and 2430. The third current mirror 2410 is therefore biased by a current Icontrol=Iopto−Iref. An output of the third mirror 2410 is connected to the input of the first current mirror 2420 and the current source 2440, therefore giving Iref=Ioptoref−Icontrol. On the other hand it also holds that Icontrol+Iref=iopto. Both equations combined give one solution: Iopto=ioptoref. Thus, Iref is the output of the adaptive current supply 2420, 2430 in order to make Iopto equal to Ioptoref.

As soon as Iopto becones larger than ioptoref, Icontrol rapidly increases to infinity, while it drops to 0 when Iopto becomes smaller than Ioptoref.

The circuit principle of FIG. 24 therefore gives an infinitely large control current, Icontrol, for Iopto>Ioptoref and zero control current, Icontrol, for Iopto<Ioptoref. Therefore, a current limit for Iref<0 should be added in practice to limit Icontrol to a maximum. Although this circuit gives the desired infinite gain from Iopto to Icontrol for DC, also for AC, this gain is infinite, while it is desired according to the invention to have a well defined gain for frequencies above a certain value.

Figure 25:
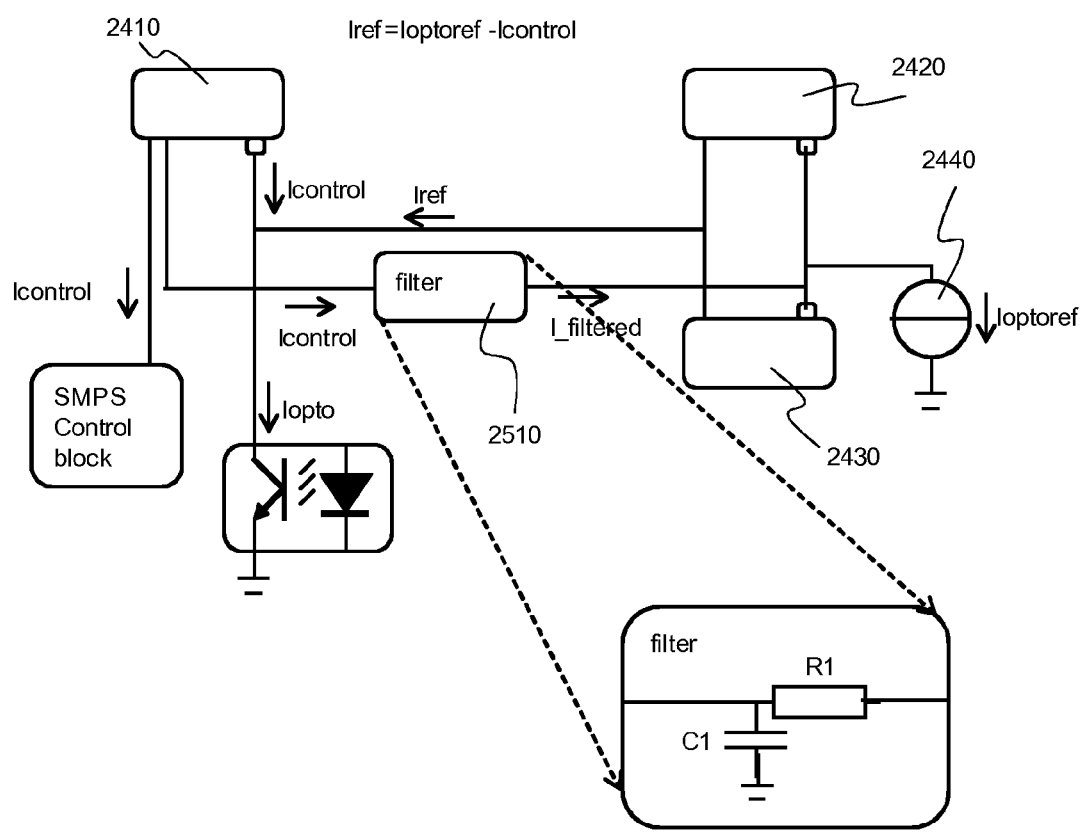
FIG. 25 is a schematic diagram of a variant of the primary control circuit in FIG. 24.

In order to realize the desired behaviour where Icontrol is proportional to Iopto for high frequencies, a filter can be added in the path where Icontrol is fed back to be subtracted from Ioptoref. Without this path, the original principle of FIG. 18 remains with Iref=Ioptoref, making Icontrol proportional to Iopto. With a filter, the frequency for changeover between the proportional mode and the infinite gain mode can be set. An example of an embodiment with such a filter 2510 is given in FIG. 25. This embodiment is otherwise similar to the embodiment of FIG. 24. The filter comprises a capacitor C1 to ground and a series resistor R1.

For low frequencies, I_filtered equals Icontrol, giving the infinite gain mode. For high frequencies, C1 and R1 form a current divider, where most of the current is shorted to ground by C1, effectively taking away the feedback path and giving a gain from Iopto to Icontrol of 1. As those skilled in the art will appreciate, although the filter is implemented using analogue components R1 and C1 in this embodiment, any other implementation of the filter, such as a digital implementation, is assumed to be within the scope of the invention.

According to a second part of the third aspect of the invention, the time constant is deliberately made low under certain conditions, in order to get a high gain behaviour up to a relatively low frequency, and the time constant is deliberately made high under certain other conditions, in order to get a high gain behaviour up to a relatively high frequency. The need for this second part of the third aspect of the invention is now further explained using the embodiment of FIG. 20 as an example.

When the SMPS operates at a fixed power level, the regulation loop is set at a certain operating point, where the control signal Vcontrol is set at a certain value. However, as Vsupply is regulated in order to achieve the desired current in the opto coupler, it is not always possible to increase Vcontrol to the desired level within a desired time. For small variations of the load, Vcontrol does not need to vary much; however for large positive load steps, Vcontrol is unable to rise above Vsupply. Since Vsupply can only adapt with a relatively long time constant, Vcontrol cannot follow the command of the error loop and will saturate close to the level of Vsupply. According to the second part of the third aspect of the invention, it is detected that Vsupply-Vcontrol reaches a minimum threshold, indicating that Vcontrol is close to saturation. In response, the time constant Tau is reduced, in order to let Vsupply rise as fast as needed according to the response of Vcontrol as a result of the main regulation loop. Similarly, in the case where a large negative step change of the load occurs, Vcontrol suddenly drops, resulting in an increased current in the optocoupler, because Vsupply cannot follow the steep change of Vcontrol. As the drive current for the LED side of the opto coupler is dimensioned for small current consumption, there is a risk that the driver saturates to its maximum level, making it impossible to follow the desired response. The present solution is to detect that Vsupply-Vcontrol reaches a maximum threshold, indicating that Vsupply cannot follow and, in response, the time constant Tau is reduced, in order to let Vsupply fall as fast as needed according to the response of Vcontrol as result of the main regulation loop.

Figure 26:
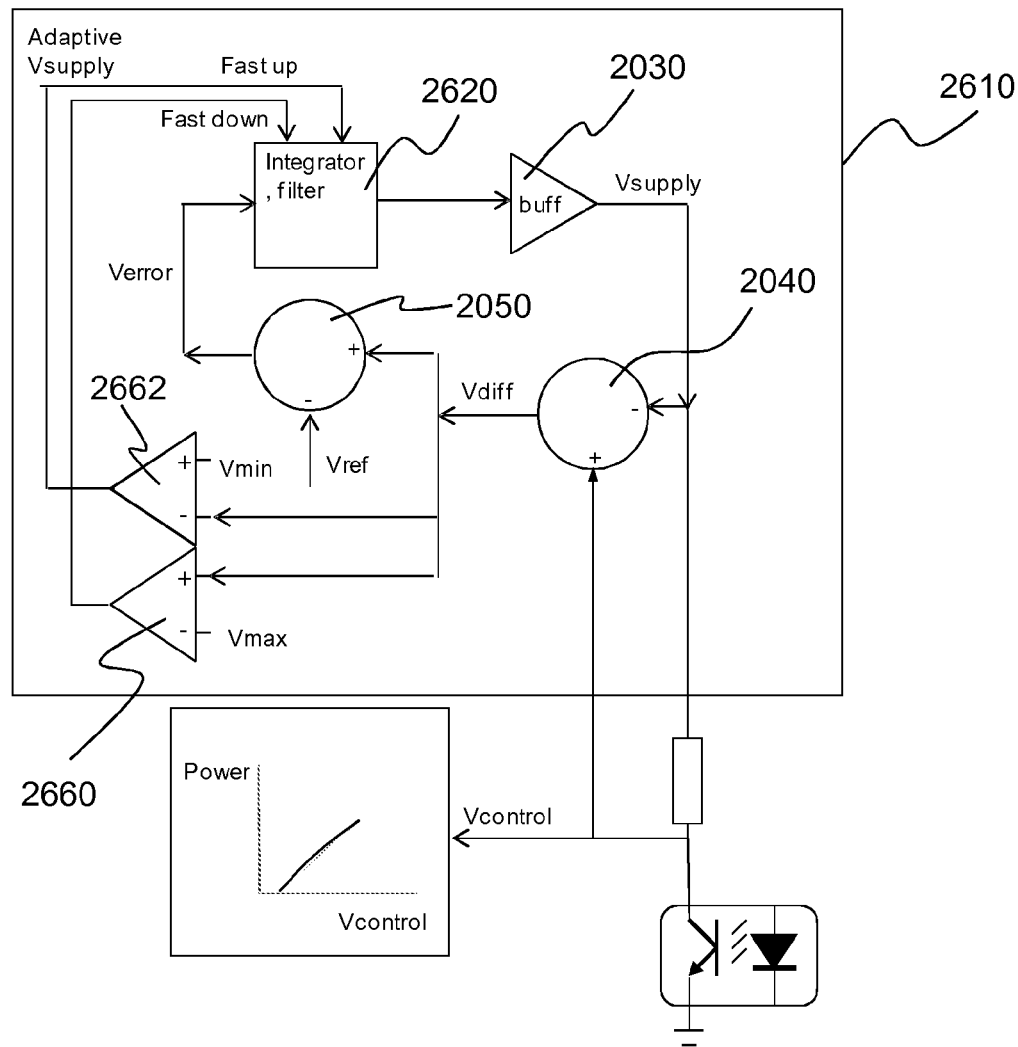
FIG. 26 is a schematic diagram of a primary control circuit according to a fourth embodiment of the third aspect of the invention.

FIG. 26 is a schematic diagram of a primary control circuit according to a fourth embodiment of the third aspect of the invention. This embodiment exploits the second part of the third aspect, as described above. It is similar in structure and operation to the embodiment of FIG. 20, with the addition of two comparators 2660 and 2662. The integrator filter 2620 comprises means to vary the time constant under the control of the comparator outputs. The comparators are arranged to detect when Vcontrol−Vsupply reaches a lower or upper threshold and the outputs of the comparators adapt the time constant Tau to a low value. This allows a faster response. The reduced value of Tau can typically be a factor of 10 to 100 times smaller than its normal value.

A similar adaptation may also be applied to other embodiments of the third aspect of the invention. For example in the embodiment of FIG. 23 Tau can be adapted when the current in the GM amplifier 2330 output reaches an upper or lower limit, while in the embodiment of FIG. 25, the time constant Tau of the filter can be made smaller when Iopto reaches a lower or upper limit.

An example means for varying the time constant is to make R1 a switched resistor, where during an interval T1 R1 is connected and during the interval Tper−T1 R1 is disconnected, in this way interrupting the current. The effective value of R1 is then set by the duty cycle: T1/(Tper−T1).

According to a third part of the third aspect of the invention, the time constant is reduced under certain conditions, in order to get a high gain behaviour up to a relatively low frequency, and the time constant is increased under certain other conditions, in order to get a high gain behaviour up to a relatively high frequency. The purpose of this part of the third aspect of the invention will now be explained in greater detail.

An SMPS operating in normal operation should have a stable loop and therefore a "low gain" is desired. For the embodiment of FIG. 20, this means that for frequencies in the range of the 0 dB loop-gain region, the transfer from Iopto to Vcontrol should be Rcoll. For the embodiment of FIG. 23, this means that for frequencies in the range of the 0 dB loop-gain region, the transfer from Iopto to Vcontrol should be 1/GM and for the embodiment of FIG. 25 this means that for frequencies in the range of the 0 dB loop-gain region, the transfer from Iopto to Icontrol should be equal to a constant, where the constant is the current gain of the mirror at the left side.

However, an SMPS operating in burst mode can suffer from this limited gain. In a burst mode, the SMPS delivers power during a burst on time interval; outside this burst on time, no power or a significantly lower power is delivered.

In specific implementations of a burst mode, the start of the burst on time is set when the current in the opto-coupler output rises above a certain level—providing an indication that the regulated output voltage of the SMPS is dropping below the regulated level. As this event is effectively a digital flag rather than an analogue value, the analogue behaviour when the low gain is selected can cause instability problems during the burst mode. This may result in different burst on times for subsequent burst periods. The reason is that the trajectory from zero current in the opto-coupler to the level where it starts the burst on time depends on the history of the previous cycle—for example, due to the capacitor in the compensation network when the gain at the opto-coupler output is low. It is therefore preferred that a high gain can be selected in burst mode in order to make the turn on instant more like a digital decision which is less sensitive to the previous operation history. This can help to prevent the potential instability identified above.

One reason that a burst mode is desirable is to prevent audible noise when the converter operates at switching frequencies below the audible limit of 20 kHz. In specific implementations of a burst mode, the burst on time is therefore defined by the condition that the primary control circuit tries to reduce the switching frequency below the audible limit. If this condition occurs, this is defined as the beginning of the burst on time. The action to be taken is then to overrule the control input and maintain the frequency just above the audible limit as long as the burst on time is maintained. At the end of the burst on time, the overruling mechanism is disabled until the start of the next burst on time. During the burst off time, the converter is not switching. The third part of the third aspect of the invention can give an advantage by producing a high gain during the burst off time, in order to make the decision to start the burst on time digital, and use a low gain during the burst on time. This can help to prevent overshoots at the control input during the beginning of the burst on time.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the various aspects of the invention are combined. For example, the compensation circuit may produce two compensation signals—one of which is added as a continuously-variable offset to the control signal; and another which provides discrete-valued control of another parameter in the primary control circuit.

A control circuit according to an embodiment of the invention can be used to control a flyback converter, as described by way of example above. However, in other embodiments, the SMPS may be of a different type—including but not limited to a resonant-type converter.

In general, the compensation circuit may comprise analogue electronic components, digital logic, or a mixture of both.

The operative signals in the compensation circuit may be voltage or current signals. That is, the circuit may operate in current mode or voltage mode.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A control circuit for a switched-mode power supply having an input side connectable to an electrical power source and an output side connectable to a load, the control circuit comprising:
    a primary control circuit configured to generate a driving signal for a switching element at the input side of the switched-mode power supply, the primary control circuit further comprising a compensation circuit configured to receive a control signal and produce a compensation signal, wherein the compensation circuit comprises a counter, a first comparator configured to increment the counter if a control signal exceeds a first threshold, and a second comparator configured to decrement the counter if the control signal drops below a second threshold;
    a secondary control circuit configured to monitor an output signal at the output side of the switched-mode power supply; and
    an opto-coupler receiver, wherein the opto-coupler receiver is configured to receive its input from the secondary control circuit and to provide the control signal to the primary control circuit, wherein the primary control circuit generates the driving signal based on a difference between a sense signal and the compensation signal, and the compensation signal causes a current in the opto-coupler receiver to return to a desired minimum value to reduce power consumption.

2. The control circuit of claim 1, wherein the compensation circuit is configured to generate the compensation signal such that it responds to low-frequency variations in the input to the opto-coupler to a greater extent than high-frequency variations, so that the current in the opto-coupler tends to return to a desired minimum steady-state value.

3. The control circuit of claim 1, wherein the compensation circuit further comprises:
    an adaptive voltage supply for the opto-coupler.

4. The control circuit of claim 1, wherein the compensation circuit further comprises:
    a transconductance amplifier, and the compensation signal is a compensation current output from said transconductance amplifier.

5. The control circuit of claim 1, wherein the compensation circuit further comprises:
    an adaptive current supply for the opto-coupler.

6. The control circuit of claim 5, wherein the compensation signal is a reference current and the current in the opto-coupler is a sum of the control current and the reference current.

7. The control circuit of claim 6, wherein the compensation circuit is configured to generate the reference current as a function of a low-pass filtered version of the control current.

8. The control circuit of claim 1, wherein a time constant with which the compensation signal responds to variations in the input to the opto-coupler is variable.

9. The control circuit of claim 8, wherein the time constant is variable according to at least one of: an amplitude of the control signal; and whether or not the switched-mode power supply is operating in a burst mode.

10. The control circuit of claim 1, wherein the primary control circuit is configured to generate the driving signal based upon a combination of the control signal and the compensation signal, and the compensation circuit is configured to detect, in the control signal, changes from a desired operating condition and generate the compensation signal such that the control signal tends to return to the desired operating condition.

11. The control circuit of claim 10, wherein the primary control circuit is configured to add the compensation signal and the control signal, and to use the resulting summed signal to generate the driving signal,.

12. The control circuit of claim 11, wherein the compensation circuit is configured to compare the control signal with a predetermined reference value and to generate the compensation signal based on the result of this comparison.

13. The control circuit of claim 10, wherein the primary control circuit is configured so that the compensation signal influences a peak current in the input side of the switched-mode power supply, or a conversion frequency of the switched-mode power supply.

* * * * *